Feb. 8, 1966  R. G. HOLMAN  3,234,362

MACHINE FOR WINDING A BALL

Original Filed Dec. 30, 1957  13 Sheets-Sheet 1

INVENTOR.
RUDOLPH G. HOLMAN
BY
ATTORNEY.

INVENTOR.
RUDOLPH G. HOLMAN
BY
Nicholas T. Vohx
ATTORNEY.

Feb. 8, 1966     R. G. HOLMAN     3,234,362

MACHINE FOR WINDING A BALL

Original Filed Dec. 30, 1957     13 Sheets-Sheet 3

INVENTOR.
RUDOLPH G. HOLMAN
BY
Nicholas T. Vohr
ATTORNEY.

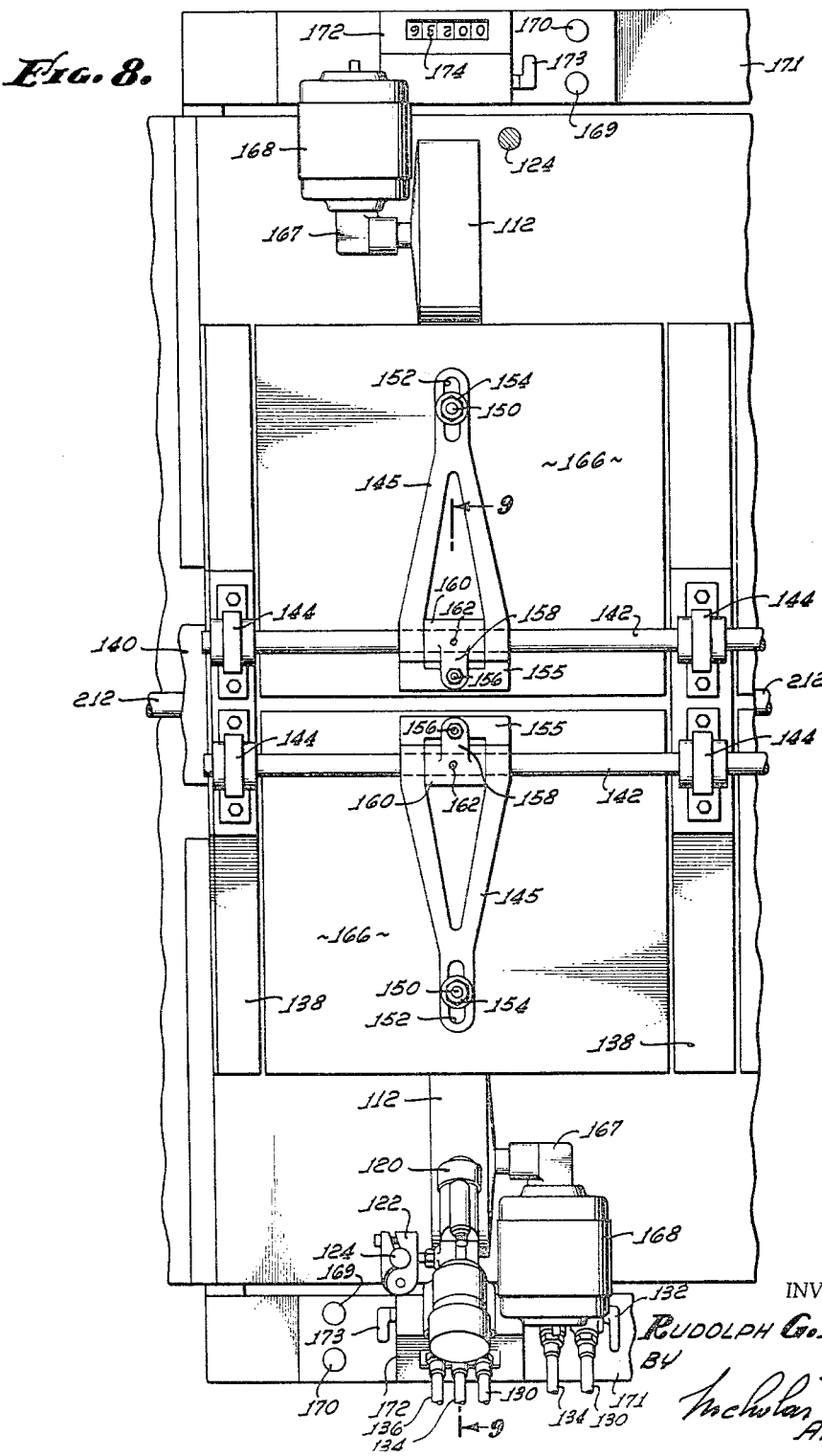

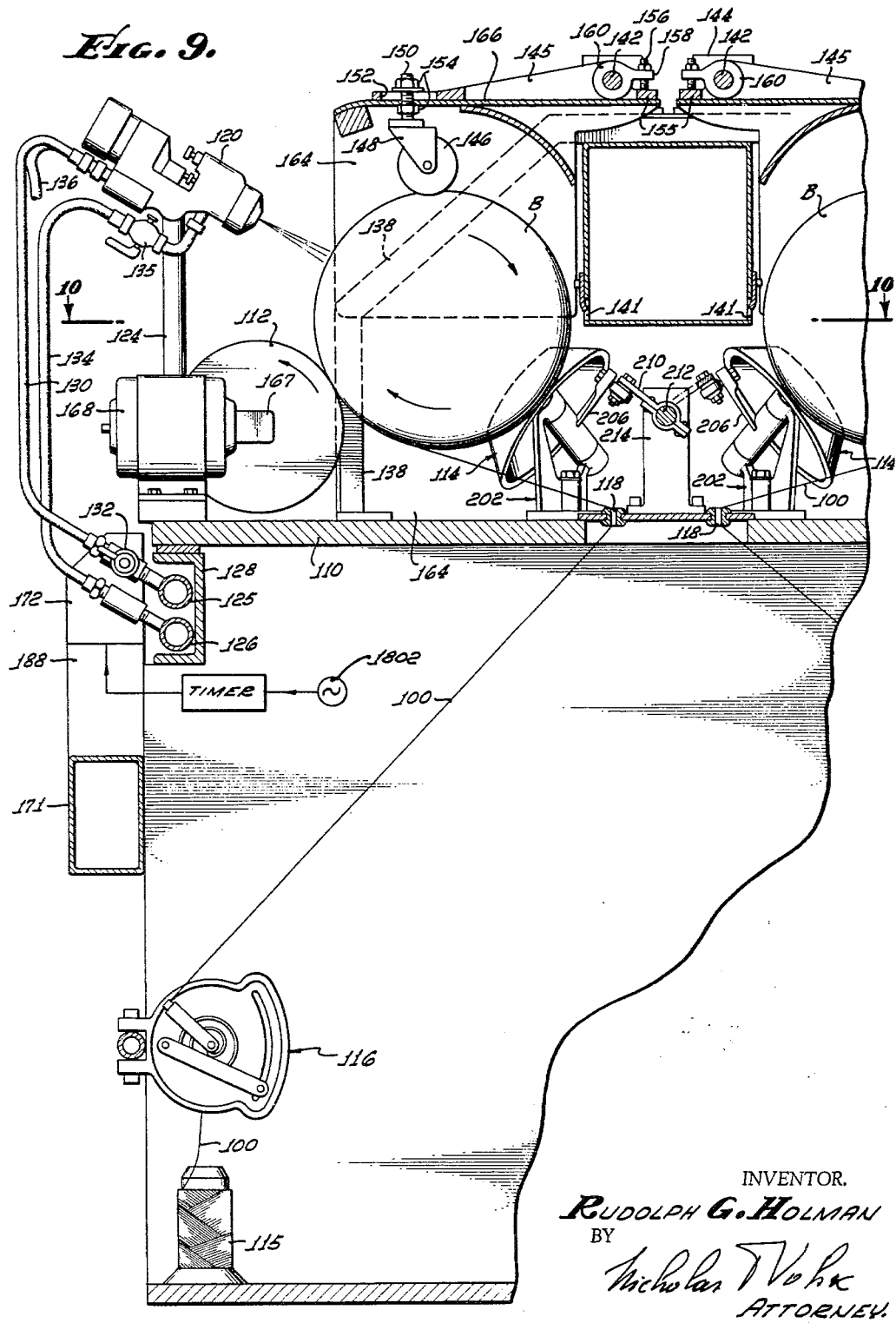

Feb. 8, 1966     R. G. HOLMAN     3,234,362
MACHINE FOR WINDING A BALL
Original Filed Dec. 30, 1957     13 Sheets-Sheet 6
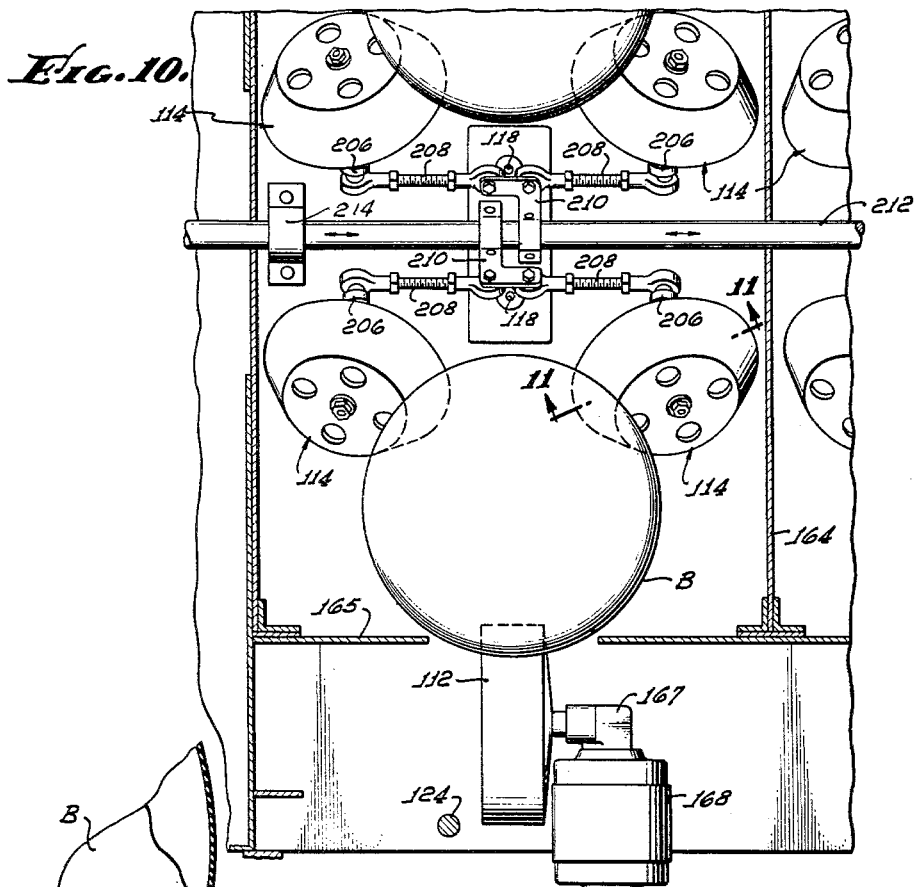
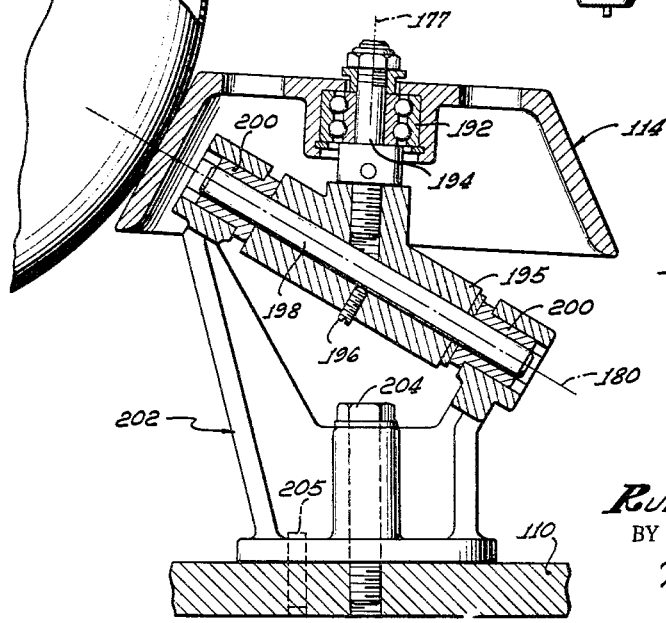
INVENTOR.
RUDOLPH G. HOLMAN
BY
ATTORNEY.

Feb. 8, 1966 R. G. HOLMAN 3,234,362
MACHINE FOR WINDING A BALL
Original Filed Dec. 30, 1957 13 Sheets-Sheet 7

INVENTOR.
RUDOLPH G. HOLMAN
BY
Nicholas T Vohr
ATTORNEY.

Feb. 8, 1966  R. G. HOLMAN  3,234,362
MACHINE FOR WINDING A BALL
Original Filed Dec. 30, 1957  13 Sheets-Sheet 8

INVENTOR.
RUDOLPH G. HOLMAN
BY
Nicholas T Volk
ATTORNEY.

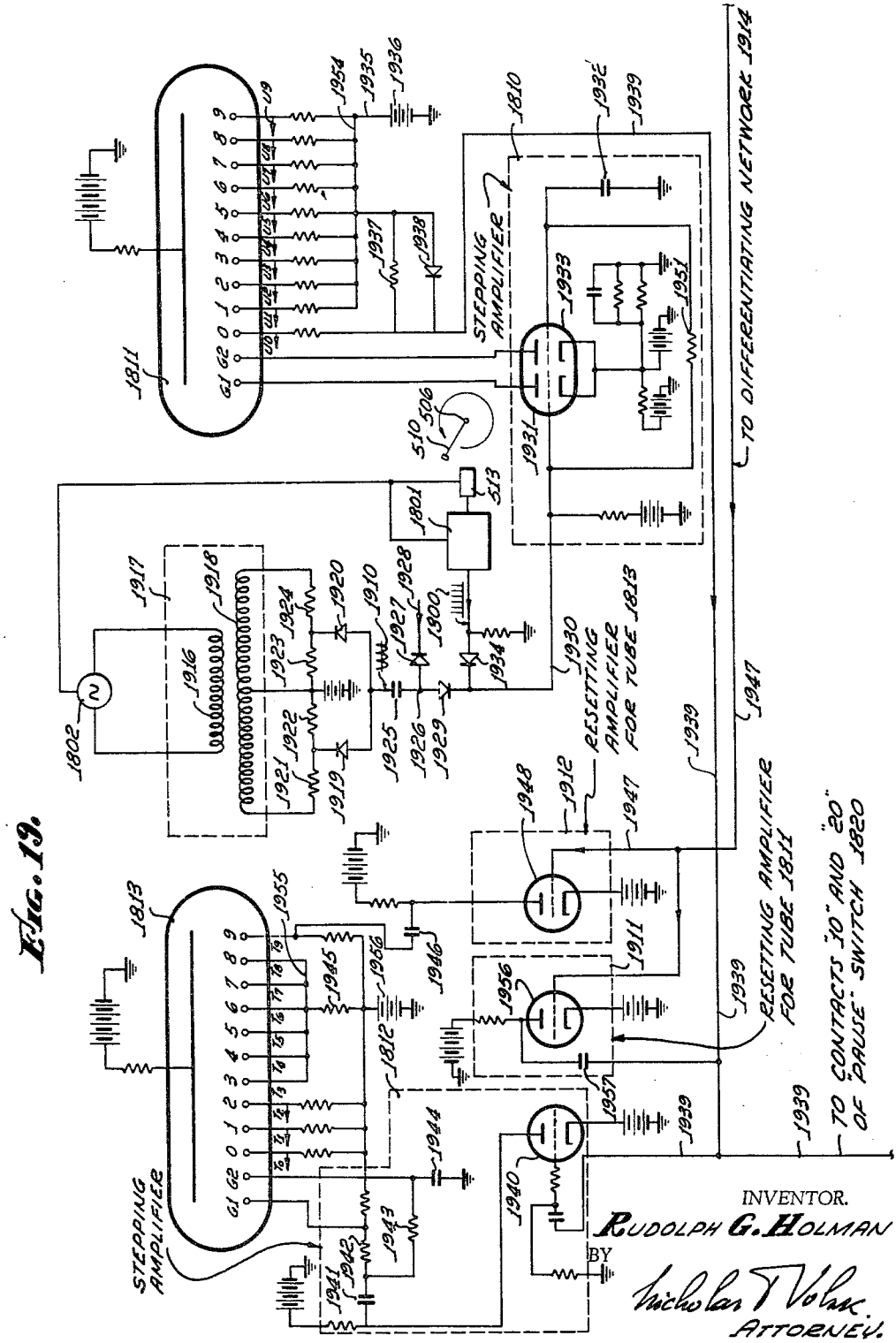

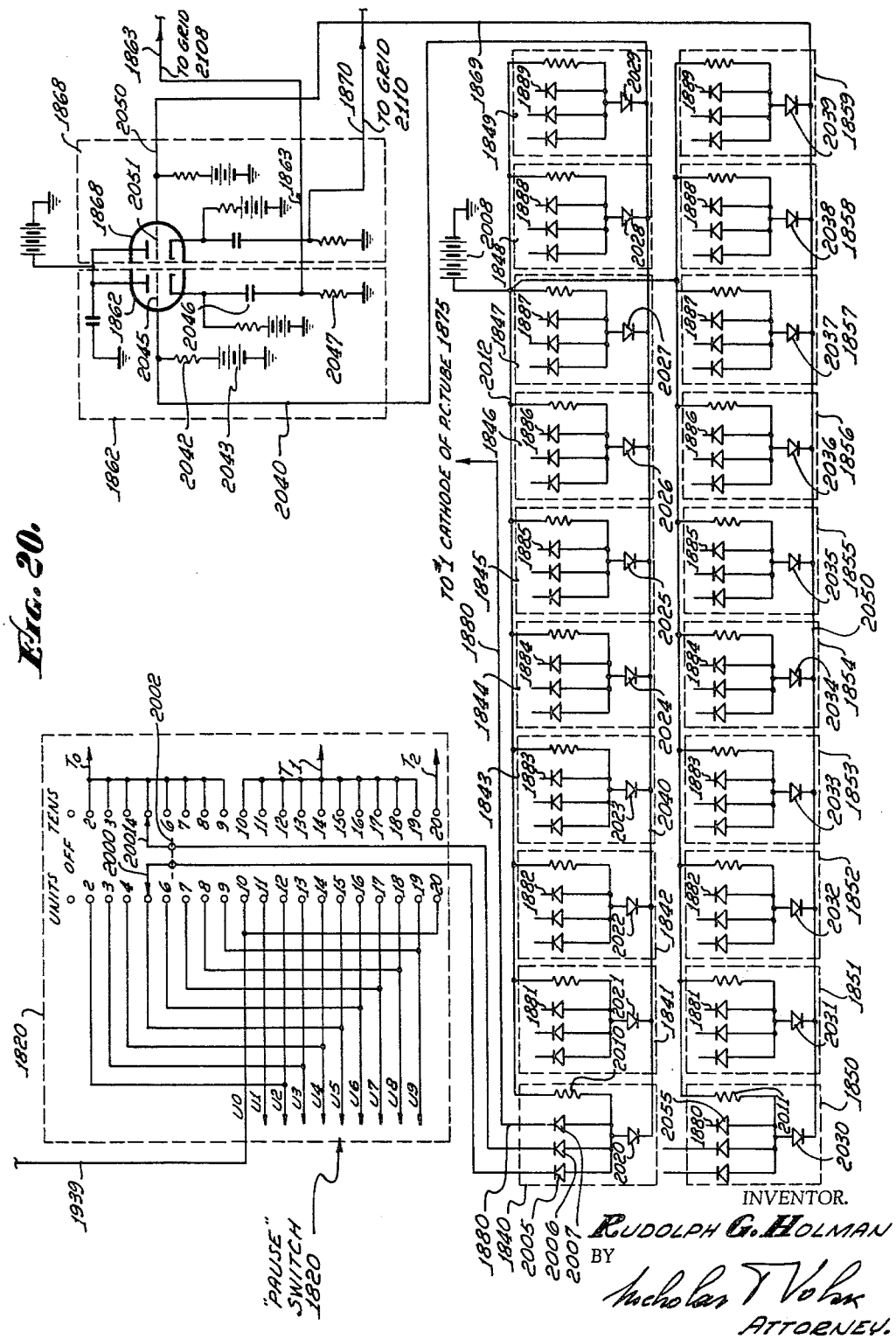

Feb. 8, 1966 R. G. HOLMAN 3,234,362
MACHINE FOR WINDING A BALL
Original Filed Dec. 30, 1957 13 Sheets-Sheet 11
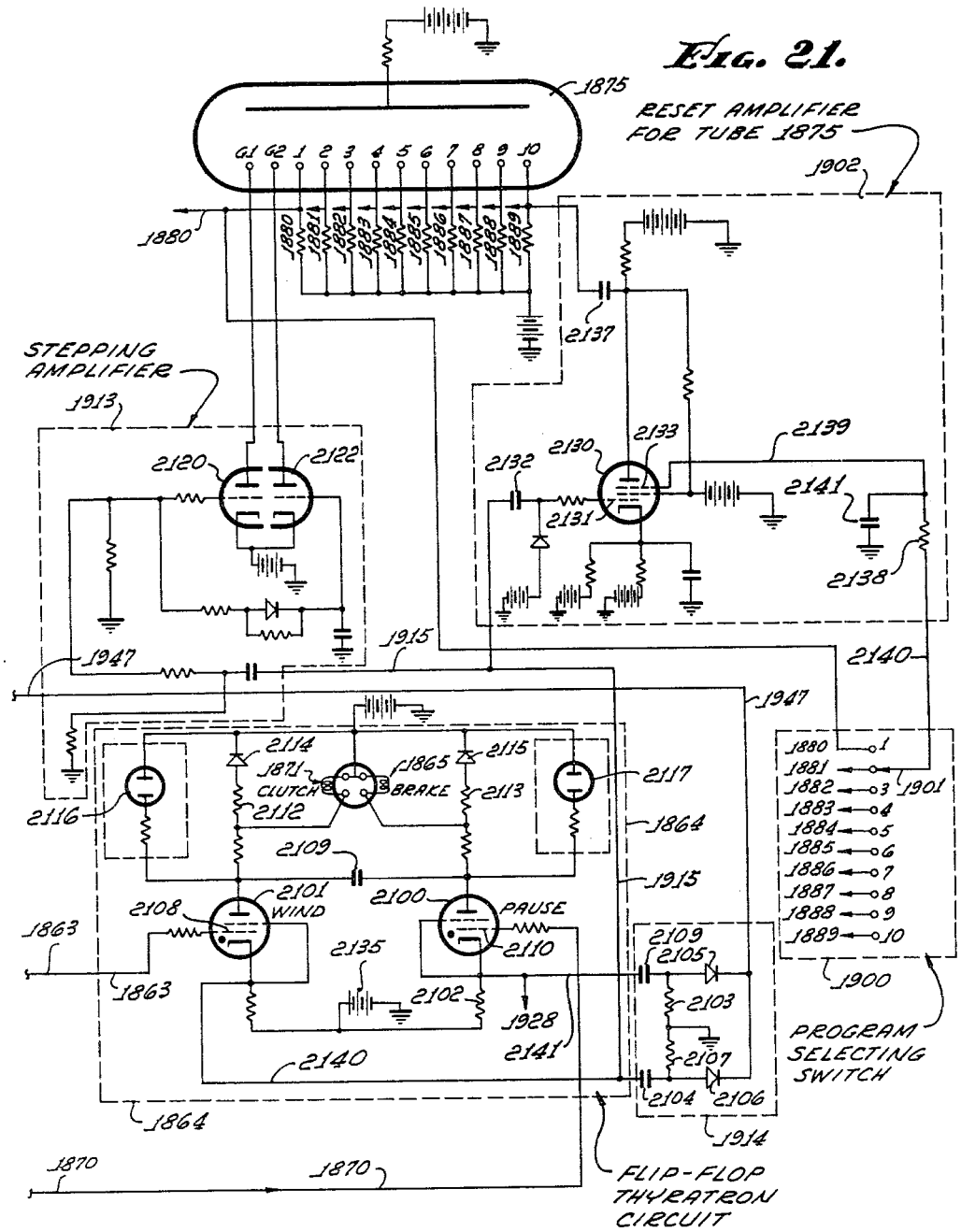
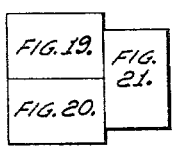
INVENTOR.
RUDOLPH G. HOLMAN
BY
Nicholas T Vohr
ATTORNEY.

Feb. 8, 1966 R. G. HOLMAN 3,234,362
MACHINE FOR WINDING A BALL
Original Filed Dec. 30, 1957 13 Sheets-Sheet 12

INVENTOR.
*RUDOLPH G. HOLMAN*
BY
*Nicholas T Volk*
ATTORNEY.

Feb. 8, 1966

R. G. HOLMAN 3,234,362

MACHINE FOR WINDING A BALL

Original Filed Dec. 30, 1957

INVENTOR.
RUDOLPH G. HOLMAN
BY
ATTORNEY.

United States Patent Office 3,234,362
Patented Feb. 8, 1966

3,234,362
MACHINE FOR WINDING A BALL
Rudolph G. Holman, Anaheim, Calif., assignor to W. J.
Voit Rubber Corp., a corporation of California
Original application Dec. 30, 1957, Ser. No. 705,994, now
Patent No. 2,995,311, dated Aug. 8, 1961. Divided
and this application Oct. 12, 1960, Ser. No. 62,293
7 Claims. (Cl. 235—151.1)

This invention relates to an apparatus for making a winding on play balls and commercial balls. The invention is applicable to such balls as volley balls, basketballs, baseballs, etc. and also balls which are used as floats, buoys, fish-net balls and other spherical articles requiring a reinforcing winding or a carcass made of fine string or thread.

This application for patent is a division of the parent application Serial Number 705,994, filed December 30, 1957, now Patent No. 2,995,311, entitled, The Method of Winding a Ball.

The parent application discusses the method of producing a winding on a ball while this application relates to the apparatus for applying the winding to the ball.

The thread windings, or a "winding" as it will be called in this specification (the completed layer of wound thread) fixes the size of the ball and provides a very strong flexible layer on the ball which can resist pressure of air pumped into the ball.

The disclosed apparatus for applying the winding to a ball is an electronically-controlled apparatus which permits the introduction of a large number of control stations for selecting and modifying each "program cycle" and the number of the program cycles used, or contained in "the complete cycle." The meaning of these two terms, the "program cycle" and the "complete cycle" will become more apparent from the description of the "programming system," which is the electronic system controlling the mechanic components of the ball-winding machine. Briefly stated, the program cycle is the cycle which determines the number of turns used in the cycle, the position of these individual 360° turns on the outer surface of the ball, the position of the turns with respect to each other within the program cycle and the position of the program cycles with respect to each other on the ball's surface. The program cycle has a winding period, or time interval, and the pause period, the two time periods constituting the complete program cycle. All of the parameters of the program cycle can be varied by means of the programming system and since each individual cycle may be made to be identical to all other program cycles or may be made to differ from all other program cycles, it becomes necessary to introduce the additional term, the "complete cycle" which defines, or describes the number of the individual program cycles included in the complete cycle. By definition, it means that the complete cycle may include a variable number of the program cycles. In the illustrated electronic programming system such number of the program cycles within the complete cycle may vary from 1 to 10 merely because there are ten pairs of program cycle switches and electronic gates in the system. This number of components may be decreased or increased with the corresponding decrease or increase in the number of available variables in the complete cycle.

For the sake of simplicity, it will be assumed in this introductory part of the specification that the program cycle has six complete turns (it may have from 2 to 20 turns with the disclosed apparatus) in each program cycle and that this cycle repeats itself throughout the complete cycle. It should be mentioned here, that the complete winding may include a large number of the complete cycles, such as 8–20, depending on the number of the program cycles in the complete cycle and the type of the desired winding. In the above example, it has been assumed arbitrarily that the complete cycle includes ten program cycles.

With the above simplifying assumptions, each of the successive winding periods within the program cycles comprises a group of turns which may be compared with, and which resemble, a series of intersecting great circles of longitude on a globe representing the earth. Thus, the successive individual turns of a wind period intersect in two diametrically opposite polar regions of the ball, just as the imaginary lines of longitude intersect at the two opposite polar regions of the earth. The transition from one wind period to another is accomplished simply by continuing the final turn of a preceding wind period along a true great circle for a predetermined fraction of a turn during the pause period of each program cycle and then repeating the original wind period with the ensuing successive turns intersecting at a new pair of polar regions. The new pair of polar regions is displaced from the preceding pair by a predetermined distance and also in a predetermined relative direction, as determined by the duration of the pause period within each program cycle.

While the new winding pattern may be controlled and predetermined with high precision, it is, nevertheless, exceedingly flexible in that the pattern and several parameters of the program cycle and of a group of program cycles, constituting the complete cycle, may be widely varied with the aid of an electronic programming system in various definitely known respects within the judgment exercised by those operating the machine.

It is, therefore, an object of this invention to provide an electronically controlled ball-winding machine which is capable of producing a winding on a ball having a predetermined controllable pattern composed of the previously defined program cycles and complete cycles.

It is an additional object of this invention to provide a machine of the above type in which the parameters of the program cycle and of the complete cycle may be varied in a predetermined predictable manner.

It is also an object of this invention to provide a machine for producing a winding on a spherical object which satisfies many desired requirements, such as finite thickness, flexibility, bursting pressure, weight, uniformity of stress-strain characteristics throughout the spherical configuration of the winding and its thickness, dynamic characteristics of a ball when such winding is used for making play-balls, and a number of other features which must be satisfied by the windings of the above type, including reasonable cost, smooth outer surface, uniform distribution of individual turns throughout the winding, and as close an approximation of great circles as possible by the individual turns so long as such approximation constitutes a practicable compromise with the optimum solution of the requirements imposed by the numerous other winding parameters.

The novel features which are believed to be characteristic of the invention, both as to its organization and method of operation, together with further objects and advantages thereof, will be better understood from the following description taken in connection with the accompanying drawings in which several embodiments of the invention are illustrated as examples of the invention. It is to be expressly understood, however, that the drawings are for the purpose of illustration and description only, and are not intended as a definition of the elements of the invention. Referring to the drawings:

FIG. 8 is a plan view of two winding stations;

FIG. 9 is a vertical sectional view of the winding apparatus taken along line 9—9 shown in FIG. 8, this view being the view of the winding mechanism at one of the winding stations;

FIG. 10 is a plan, or horizontal view of one station, which view is partly in section taken along line 10—10 illustrated in FIG. 9;

FIG. 11 is a sectional view of an idler roller taken along line 11—11 shown in FIG. 10;

FIGS. 19 through 21 are the schematic diagrams of the computer;

FIG. 22 illustrates the matching positions of FIGS. 21 through 23 with respect to each other for obtaining the complete schematic diagram;

Figure 1:
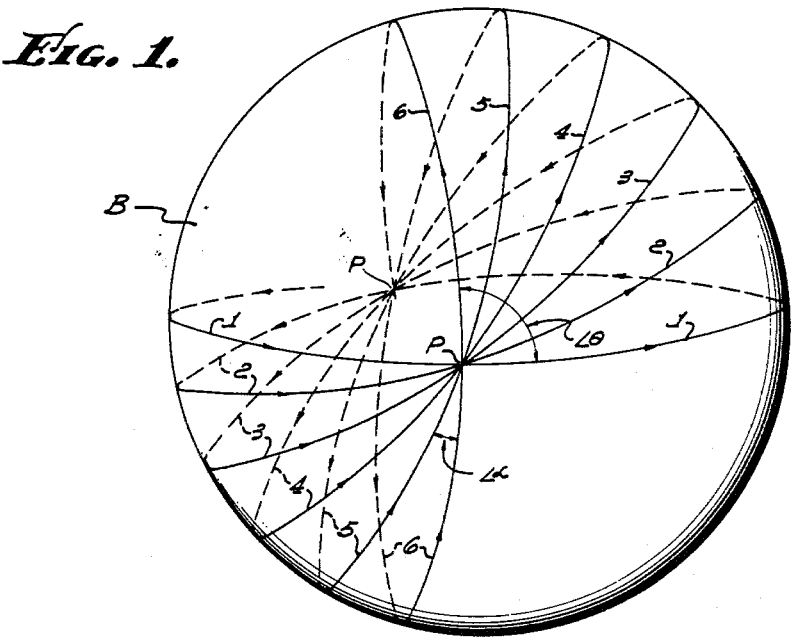
FIG. 1 is a diagrammatic view of a sphere with a group of winding turns constituting a portion of the winding applied during one program cycle.
Figure 3:
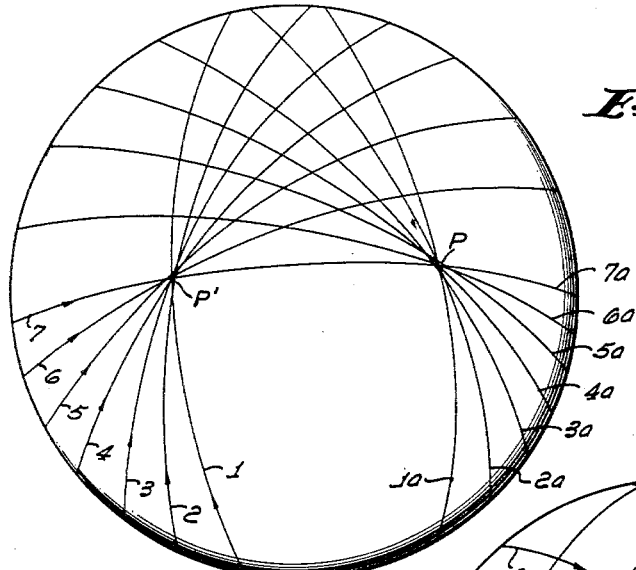
FIG. 3 is a plan view of the distribution of turns in a typical program cycle, and especially the type of a polar region which may be employed with the invention.
Figure 4:
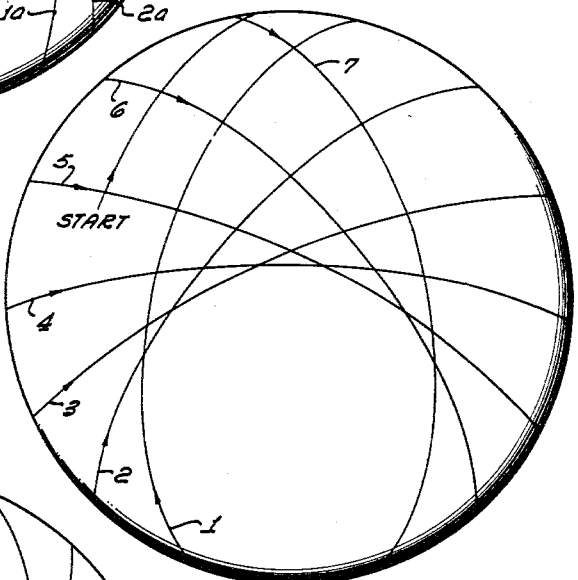
FIGS. 4 and 4A are additional plan views of another type of the distribution of turns in a single program cycle.
Figure 4A:
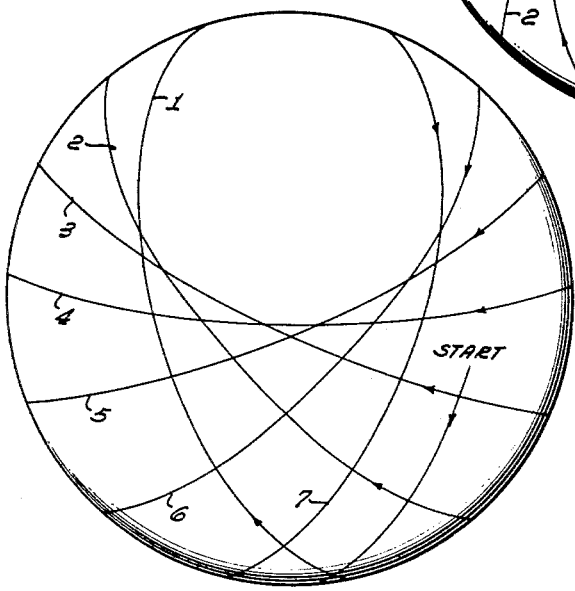

Referring to FIG. 1, it represents a ball having six turns applied to the ball during the first program cycle, the successive turns of the cycle being numbered 1 to 6. In this particular instance, the illustrated program cycle is the type in which all of the windings intersect at two polar points P, there being two such polar points at diametrically opposite positions on the periphery of the ball, and the number of turns has been limited to six turns. Moreover, the successive turns of the winding are displaced by an angle α which, in the selected program cycle is equal to approximately 15° as measured by the angles at the polar points P. Thus, the total displacement for this particular program cycle is 90° and the completed winding period of the program cycle covers approximately two diametrically opposite quadrants of the spherical area of the ball. As will be pointed out later, the number of turns, angle α and the locus of points P may be varied in each winding period of each program cycle, which cycle includes the winding period and the pause period. The duration of the pause period can also be varied and it is the duration of the pause period that determines the angular displacement of the "polarized group turns" (turns 1 through 6 in FIG. 1) which are produced during the winding period of each program cycle. This will be discussed more in detail in connection with FIGS. 2, 3 and 4.

Figure 2:
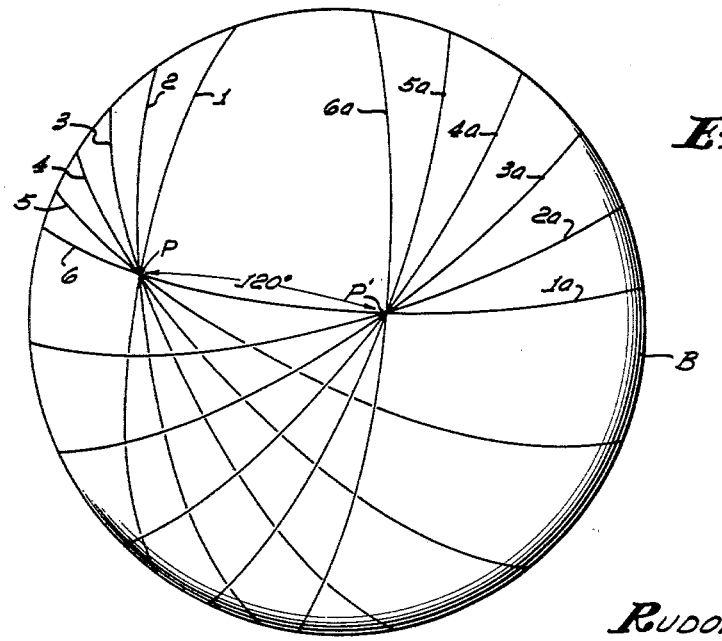
FIG. 2 is a similar view showing a second succeeding winding period of the next program cycle added to the first program cycle to show the geometrical relationship between successive program cycles.

FIG. 2 shows the next succeeding polarized group of turns comprising six identical turns, numbered 1a to 6a, intersecting at a pair of diametrically opposite pole points P'. It is to be noted that the last turn 6 of the first winding program-cycle is continued, the two poles P and P' being spaced apart on the continuation of turn 6. The circular distance P–P' is, of course, a fraction of a circle, and in the selected example angle θ FIG. 1 is equal to 120°. In the same way a third successive polarized group of turns, which is not shown in FIG. 2, would start with the continuation of the turn 6–a and one of the poles of the third winding period would be on the turn 6–a, the adjacent poles being displaced by 120°. It is apparent that the paths described by the successive pairs of poles will conform to a particular geometrical pattern, the selected pattern of pole migration being such as to achieve the desired uniform distribution of the wound material over the spherical area of the ball. In the above example, angle θ remains constant, angle α remains constant and η also remains constant, where η is the number of complete turns produced during time $t_w$, where $t_w$ is the duration of the winding period of the program cycle. As stated previously, all of the above parameters, η, $t_w$, θ and α can be varied in the manner described below.

For a more detailed description of the windings, individual turns, and the pattern followed by the individual turns, reference is made to the patent application Serial Number 705,994, now U.S. Patent 2,995,311, issued August 8, 1961, which is made a part of this disclosure.

BALL-WINDING MACHINE

(Mechanical portion)

Proceeding now with the description of the winding apparatus, FIGS. 5 through 11 disclose the mechanical portion of the ball winding machine which is controlled by the electronic programmer illustrated in FIGS. 18 through 22.

Figure 5:
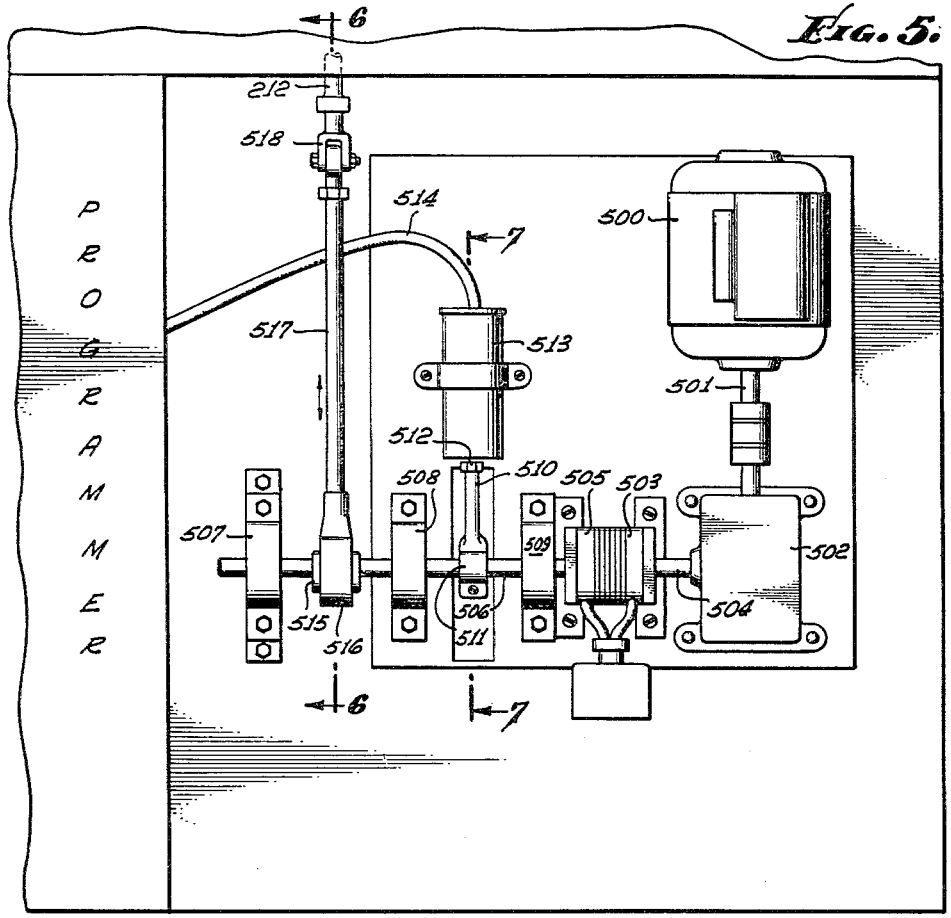
FIG. 5 is a plan view of the drive mechanism for a reciprocating rod including the driving motor, computer-controlled clutch and brake, a revolutions pulse generator, a cam and the reciprocating rod.
Figure 6:
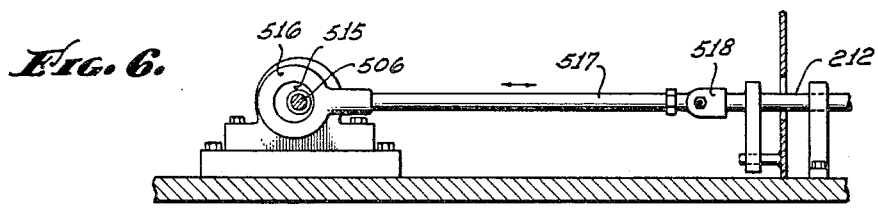
FIG. 6 is a side view of the cam shown in FIG. 5.

Referring to FIG. 5 a synchronous motor 500 is connected to a source of power such as 60 cycle alternating current power line. The synchronous motor is connected to a shaft 501, a gear box 502 and electrically actuated clutch 503 connected to a shaft 504 and electrically actuated brake 505 and shaft 506 mounted in bearings 507, 508 and 509. Shaft 506, which is connected to and disconnected from shafts 504 and 501 by means of the electric clutch 503, also includes a rotatable permanent magnet arm 510 which is rigidly attached to shaft 506 by means of a clamp 511. This arm has an adjustable pole-piece 512 which is adjusted to produce a low reluctance path through a magnetic pick-up circuit 513. The arm 510 and circuit 513 generate a pulse and impress it on a conductor 514 connected to the electronic programmer which controls the operation of clutch 503 and of brake 505 in such a manner so as to start and stop the rotation of shaft 506 for controlling the winding pattern produced on the ball. Shaft 506 also includes a cam 515 which is also shown in FIG. 6. This cam is attached to shaft 506 and revolves with the shaft.

Cam 515 is mechanically connected to a cam follower 516 and cam follower 516 is connected to a reciprocating arm 517. Arm 517 in turn is connected through a coupling 518 to a reciprocating rod 212 which controls the position of all ball-supporting beveled rollers 114, FIGS. 10, 11, 9 and 12–17 and in this manner controls the type of a single turn produced on the ball, such as turns 1 through 6 illustrated in FIG. 1. The eccentricity of cam 515 controls the magnitude of the angle α and of the angle θ since angle θ is equal to the angle α multiplied by the number of complete turns used in a single winding cycle or period, i.e. $\theta = \alpha \cdot \eta$. As will be pointed out later, it is also possible to vary α and θ by an additional control means, other than cam 515 which will be described later after concluding the description of FIGS. 5 through 23.

Figure 7:
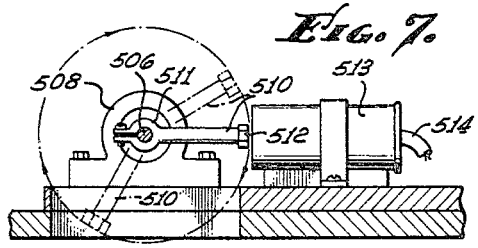
FIG. 7 is a side view of the revolutions pulse generator shown in FIG. 5.

The side views of cam 515 and of the mechanical arm 510 and of the pulse generator 513 is also illustrated in FIGS. 6 and 7. FIG. 7 also illustrates the direction of rotation of the mechanical arm 510. It is immaterial whether shaft 506 rotates clockwise or counter-clockwise.

The synchronous motor 500 is connected to the power line through an appropriate switch (not illustrated) and this switch remains closed as long as the winding machine is in operation. Therefore, motor 500 provides a constant speed drive for the reciprocating rod 212 which is thus reciprocated in synchronism with the remaining drive mechanisms of the machine. These additional drive mechanisms are also driven by the synchronous motors connected to the same source of A.C. power having a constant frequency. Accordingly, as long as the synchronous motor 500 and all other synchronous motors are connected to the constant frequency source, the programming of the program-cycle and of the complete cycle is determined by the signals delivered by the programmer to clutch 503 and brake 505.

The reciprocating rod 212 may control any number of individual ball winding units, the term "unit" being considered here as constituting a single station of the machine capable of winding a single ball. In the example illustrated in FIGS. 5 through 23, the reciprocating rod 212 controls 20 units, or stations, ten stations being arranged in a single row on one side of the rod and ten additional stations being arranged in the second row on the other side of rod 212, the two rows being in a back-to-back relationship with respect to each other with the reciprocating rod 212 being a common element for both rows.

The plan views and the side-views of the two back-to-back stations of the above type is illustrated in FIGS. 8, 9 and 10. Referring to FIGS. 8 through 11 collectively, where the same elements bear the same numerals, the two rows of stations are mounted on two elevated co-planar platforms or base plates 110. Each of the winding stations has a drive roller 112 and two beveled idler rollers 114 which cooperate to provide a three-point seat for supporting a ball B. At each of the winding stations a thread 100 is supplied by a spool 115 and controlled by a well known type of automatic tensioning device 116. Thread 100 is led upward through a sleeved aperture 118 to the periphery of the ball as shown in FIG. 9. At each winding station an automizer or spray head 120 is adjustably mounted by a jaw-type holder 122, FIG. 8, on an upright support rod 124. The various spray heads are supplied by a compressed air supply pipe 125 and a liquid supply pipe 126 which are housed in a longitudinal channel 128 along each row of stations. Air from the supply pipe 125 is supplied to each of the spray heads 120 through a flexible hose 130 controlled by a valve 132 and a liquid cement from the supply pipe 126 is fed to the spray head through a hose 134 having a valve 135. A third hose 136 is connected to each spray head for remote control of the operation of the gun by air pressure. In the presently preferred practice of the invention the liquid supplied by pipe 126 is a coumaroneindene resin but other adhesive liquids can be used in various practices of the invention.

The two rows of winding stations are provided with an upright frame structure 138 mounted on plate 110. Frame 138 carries a central exhaust duct 140 for removing vapors released by the spray heads 120. This duct has an intake port 141 at each winding station. Mounted on top of the frame structure 138 is a pair of shafts 142 journaled in spaced bearings 144. Shafts 142 extend through the entire length of the machine. Rotatably mounted on these shafts 142 are a plurality of overhanging arms 145, there being one arm at each winding station to weight down ball B. Each of these overhead arms 145 carries a small pressure roller, or caster, 146 in a swivel bracket 148. The swivel bracket 148 has a shank 150 that extends through a longitudinal slot 152 in the overhead arm and is adjustably retained therein by a pair of nuts 154.

Each of the overhanging arms 145 is independently rotatable on the corresponding shaft 142 and may be individually and manually swung up and back to permit replacement of a ball at the winding station. If desired, however, all of the overhanging arms 145 on either of the two shafts 142 may be raised simultaneously by rotation of the shaft. For this purpose each of the overhanging arms 145 has a rearwardly extending flange 155 which normally rests against an adjustable screw 156 carried by a finger 158. The finger 158 is unitary with a sleeve 160 that is fixedly mounted on the corresponding shaft 142 by a set screw 162, shown in FIG. 8. It is apparent that rotation of a shaft 142 in a direction to depress the fingers 158 thereon will cause all of the overhanging arms 145 on the shaft to be rotated upward.

Each of the winding stations is partially enclosed by a suitable hood to cause the vapors released by the spraying operation to be confined and drawn off by the exhaust duct 140. The hood for each winding station includes two side walls 164, FIG. 10, a front wall 165 and a top cover 166 fastened to the overhanging arm 145 FIG. 9.

All of the drive rollers 112 of the winding stations are connected through individual gear boxes 167 to the individual synchronous motors 168 which are connected to the same source of alternating current as motor 500 in FIG. 5. Motor 168 is manually operated by means of a "start" switch 169 and "stop" switch 170. This motor is also operated (stopped) by a counter 172 in the manner described below. A metallic gutter 171 is used for housing the wiring for the motors and counters, or timers 172, which are operated by the programming system. The programmer sends timing pulses into timer 172 which has a relay (not visible) mounted in timer 172. The programmer sends a pulse every 4.3 seconds, or some other suitable time interval, which operates the counter in the timer, the dial 173 of counter (see FIG. 8, top) counting the number of pulses received by the counter. After timer 172 (or counter) receives a predetermined number of pulses, it automatically shuts off motor 168 independent of the manually operated switches 169 and 170. The operator then removes the wound ball, inserts the new ball, having no winding, connects thread 100 to the surface of the new ball by manually winding several times, depresses the timer switch 173 which again starts the winding period of the next program cycle.

As best shown in FIG. 11, each of the beveled idler rollers 114 is mounted by means of a ball bearing 192 on a spindle 194 which is carried by an inclined sleeve 195. Inclined sleeve 195 is fixedly held by a screw 196 on an inclined pivot pin 198 and the opposite ends of the pivot pin are journaled in suitable bearing bushings 200 in a bracket 202. Each of brackets 202 is mounted by a central screw 204 on the corresponding platform 110 and is secured against rotation on the platform by a suitable key or dowel 205.

Sleeve 195, that carries spindle 194, has a control arm 206 (FIGS. 9 and 10) for oscillation of the idler roller 114 about the axis of inclined pivot pin 198. As best shown in FIG. 10, the two control arms 206 of the two idler rollers 114 at each winding station are connected by a pair of corresponding links 208 to an angular bracket 210. All of the angular brackets 210 of the two rows of winding stations are fixedly mounted on the longitudinally reciprocative rod 212 (see also FIG. 5 for rod 212) that is slidingly mounted in suitable bearings 214. Rod 212 is reciprocated longitudinally by cam 515, as described previously, to cause simultaneous oscillation of all of the idler rollers 114 of the two rows of the winding stations.

As may be seen in FIG. 10, the two beveled idler rollers 114 at each winding station are relatively close together with their beveled surfaces being tangential to ball B. As may be seen in FIG. 9, the axis of the drive roller 112 at each winding station is positioned in a direction approximately 45° downward from the horizontal plane passing through the center of ball B. The axis of oscillation 177 (see FIG. 11) of each of the idler rollers 114 i.e., the axis of the inclined pivot pin 198, passes through the point of tangential contact of the beveled idler roller with the periphery of ball B and intersects the center of the ball at an angle of 45° downward from the horizontal plane passing through the center of the ball.

Figure 12:
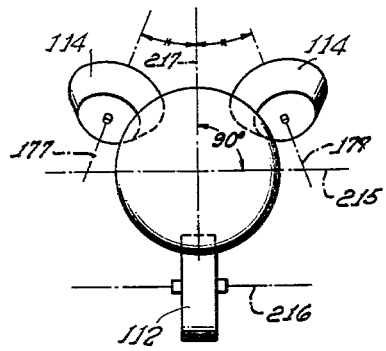
FIG. 12 is a simplified plan view of the winding mechanism at a winding station of the apparatus, the mechanism being shown at one stage of the winding operation.
Figure 13:
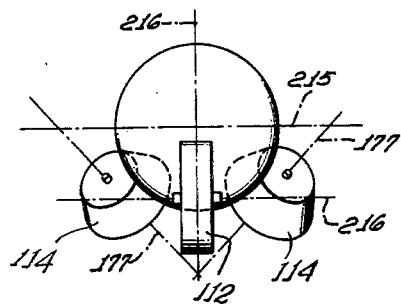
FIG. 13 is an end elevation of the structure shown in FIG. 12.
Figure 14:
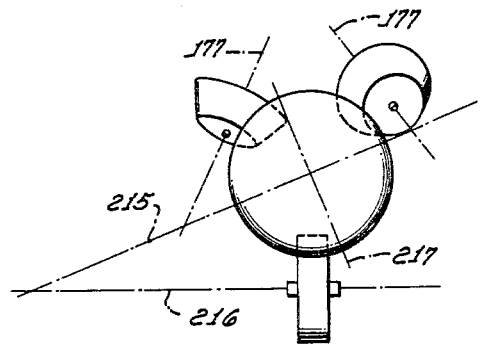
FIG. 14 is a plan view similar to FIG. 12 at another stage in the winding period.
Figure 15:
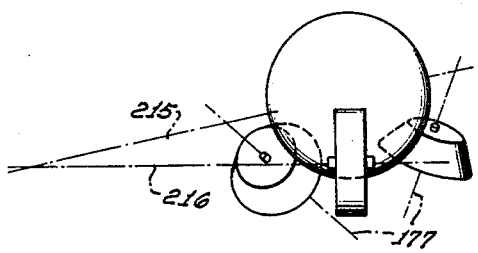
FIG. 15 is an end elevation of the structure shown in FIG. 14.
Figure 16:
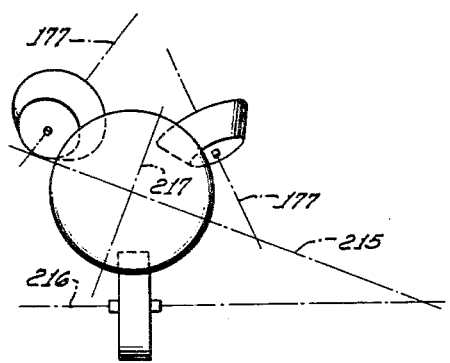
FIG. 16 is a plan view similar to FIGURES 12 and 14 showing the winding mechanism at still another stage of the winding period.
Figure 17:
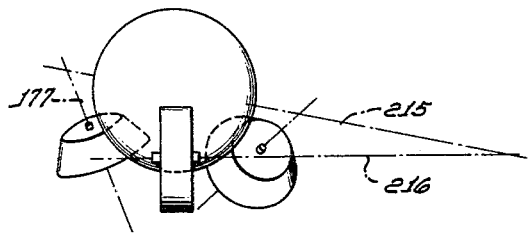
FIG. 17 is an end elevation of the structure shown in FIG. 16.

The oscillating action of the two beveled idler rollers 114 and their effect on the rotation of the ball B may be understood by reference to FIGS. 12 through 17. FIGS. 12 and 13 show both of the idler rollers 114 at their mid-points of oscillation; FIGS. 14 and 15 show the two idler rollers at one extreme of their range of oscillation; and FIGS. 16 and 17 show the two idler rollers at the other extreme of their range of oscillation. The axis of rotation of ball B is indicated by the broken line 215. In FIGS. 12 and 13 this axis 215 is parallel with the axis of rotation 216 of the drive roller 112. The axis 215 of the ball oscillates in the same plane as the axis 216 and, except for the momentary transitory position of the axis shown in FIG. 12, axis 215 intersects axis 216 as shown in FIGS. 14 through 17. The two axes of rotation 177 of the two idler rollers 114 oscillate in the plane of the axis 215 of ball B and constantly intersect axis 215. The two idler rollers 114 make one complete oscillation about the axis 177, from the position shown in FIG. 12 to that in FIG. 14, then back to the position shown in FIG. 12, then to the position shown in FIG. 16 and back to the position shown in FIG. 12 during one revolution of the ball in the illustrated program cycle. Therefore, the synchronous motors 500 and 168 are geared down so as to produce one complete revolution of shaft 506 and of cam 515 by motor 500 while motor 168 and drive roller 112 produce one revolution of ball B. If the relationship of the speed of the ball to the speed of complete oscillation of the push-rod 212 and cam 515 is as indicated above, then the angular positions of the respective turns 1 through 6 will be of the type illustrated in FIGS. 1 and 2. If the direction of the angular shift of each point of the curve followed by the thread is examined in the plan view indicated in FIGS. 1 and 2, one can see that there is a continuous angular shift of the winding in the counter-clockwise direction from turn 1 to turn 6, this counter-clockwise shift taking place around the pole P in FIG. 1 and the poles P and P' in FIG. 2. This counter-clockwise shift also applies to the half turns on the other side of the ball, which are illustrated by a series of dotted lines. Such continuous counter-clockwise shift takes place even through rod 212, obviously, has a strictly reciprocating motion because as rod 212 moves in one direction ball B travels 180° and, therefore, when rod 212 begins to move in the opposite direction it engages the opposite hemisphere of the ball with the net result that insofar as the position of the turns on the ball is concerned, they constantly shift in the counter-clockwise direction, when viewed in FIG. 1, around pole P.

ELECTRONIC PROGRAMMER

*(For controlling the ball-winding machine)*

As has been described already in the introductory part of the specification, the program cycle includes a "wind period" and a "pause period." These periods follow each other and are illustrated in FIG. 21 for ten consecutive turns. It also has been mentioned previously that it is possible to vary the duration of the wind period as well as the duration of the pause period in each program cycle. The above is illustrated diagrammatically in FIG. 24 where the program cycles are plotted along a time axis 2400. There are ten program cycles in FIG. 24 and these ten cycles make up one complete cycle.

Figure 24:
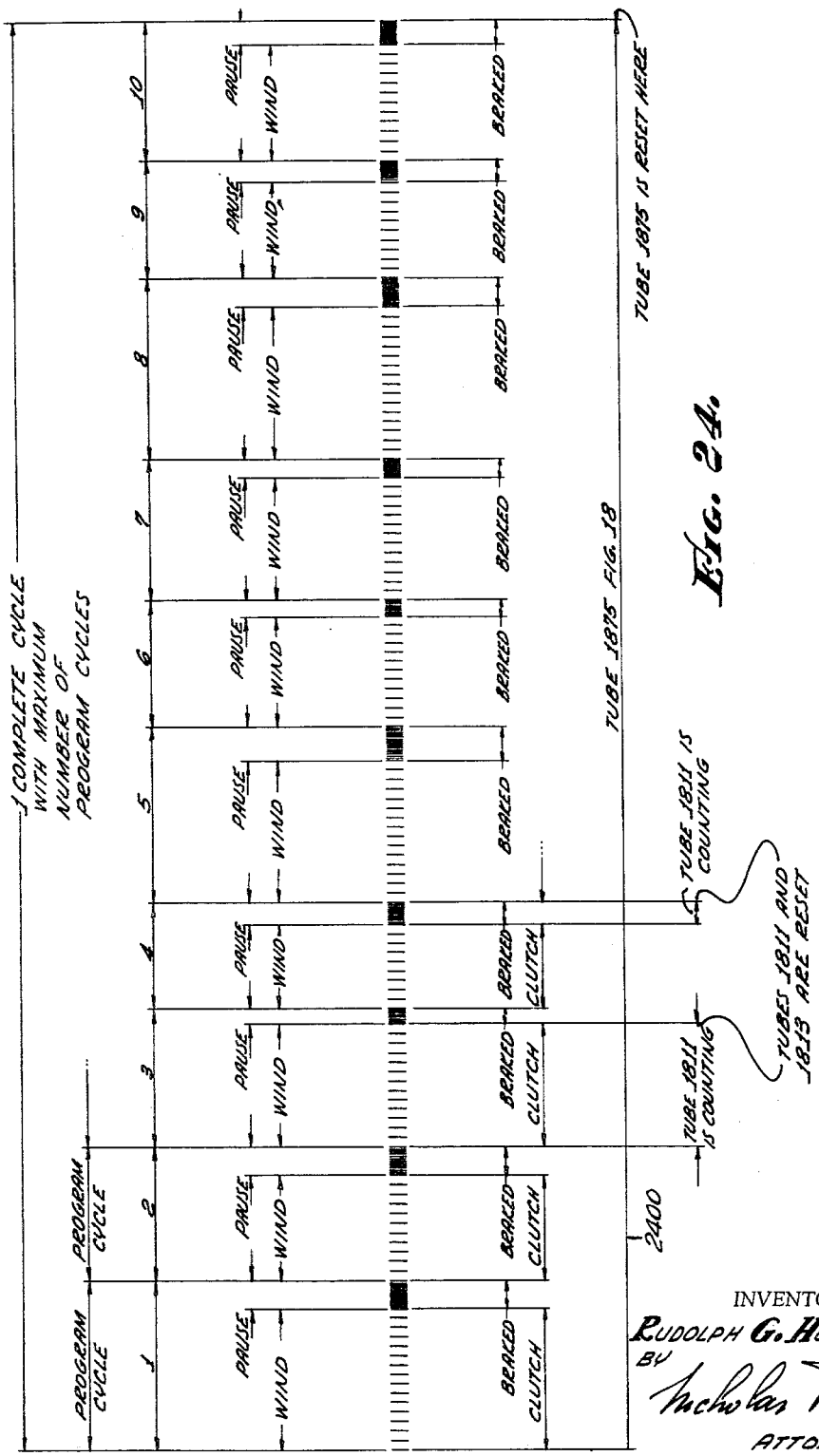
FIG. 24 is an explanatory diagram illustrating program cycles and a complete cycle plotted against time-axis.

The duration of the wind period is determined by allowing only a predetermined number of the wind timing pulses 1800 to go through the wind switch. This will become more apparent from the description of the block and schematic diagrams, FIGS. 18 through 21 of the programmer. Pulses 1800 are the pulses which are generated by the revolving magnet arm 510 and the magnetic pick-up circuit 513 and, therefore, are the pulses which determine the number of complete reciprocations performed by rod 212 and rollers 114. The timing pulses 1910 for the pause period are obtained from the 60-cycle power line by rectifying them and then obtaining 120 pulses per second timing signal which is used for operating the programmer during the pause period. Since the repetition rate of the 120 pulses per second is much higher than of the wind pulses 1800, they are more closely spaced in FIG. 21 than the wind pulses 1800. Accordingly the duration of the wind period and of the pause period in each program cycle depends on the number of pulses 1800 and 1910 allowed to get through the programmer during these two periods. As shown in FIG. 24, any desired combination of the pulses 1800 and 1910, within the limitations imposed by the wind and pause switches, can be programmed into the programmer for producing a complete cycle.

Figure 23:
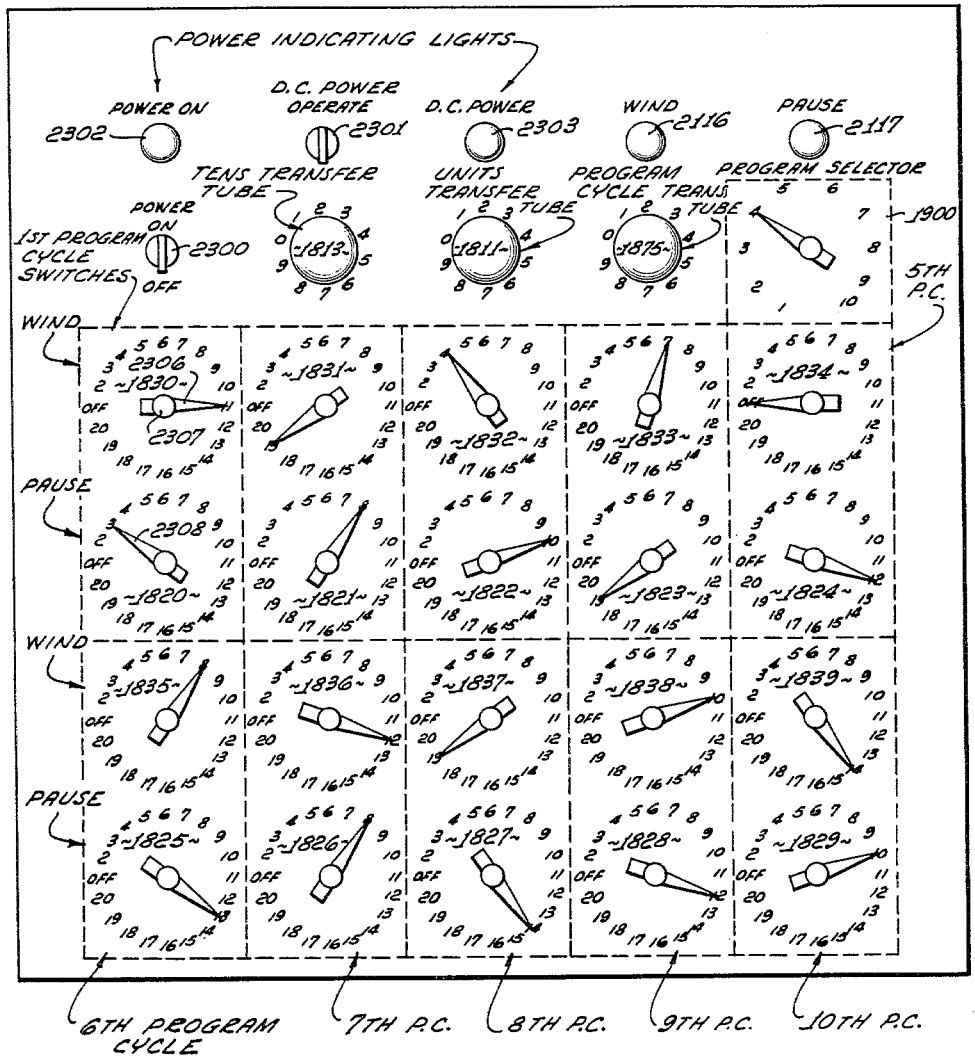
FIG. 23 is the front view of the control panel for the programmer.

The maximum number of the program cycles that may be included in one complete cycle depends on the total number of the program cycle switches that are made available on the front panel of the programmer, on the number of the cathode positions in the glow transfer tubes and also on the number of the positions available on the programming switch. The number of the positions on the programming switch is always equal to the maximum number of the program cycles available for completing one complete cycle. Since each program cycle requires a wind switch and a pause switch, (two switches) it follows that a complete cycle which includes ten program cycles will have a programming switch having ten positions and it will have ten selector switches for ten wind cycles, or periods, and ten selector switches for ten pause periods. Therefore, the complete cycle composed of ten program cycles will require twenty-one switches, altogether. The face of the panel for each programmer is illustrated in FIG. 23.

In the above example, where the complete cycle may include ten program cycles, the program selector switch permits one to include any desired number of the program cycles from one to ten, in one complete cycle. This means that when the complete cycle is made to include only one program cycle, then the first program cycle is repeated continuously during the entire winding operation for completing the entire winding of the ball. The programming switch enables one to include any number—from 1 to 10—of the program cycles in one complete cycle, and this complete cycle is repeated many times to complete the entire cord winding desired on the ball.

The programmer is so organized that it is possible to select the program cycle by means of the programming switch in the following series:

Program cycle 1 which repeats itself continuously; program cycles 1 and 2; or 1, 2 and 3; or 1, 2, 3, 4, etc. up to cycles 1 through 10.

The above will become more apparent from the description of the block and schematic diagrams, FIG. 18 through 21, the description of which is given below.

Figure 18:
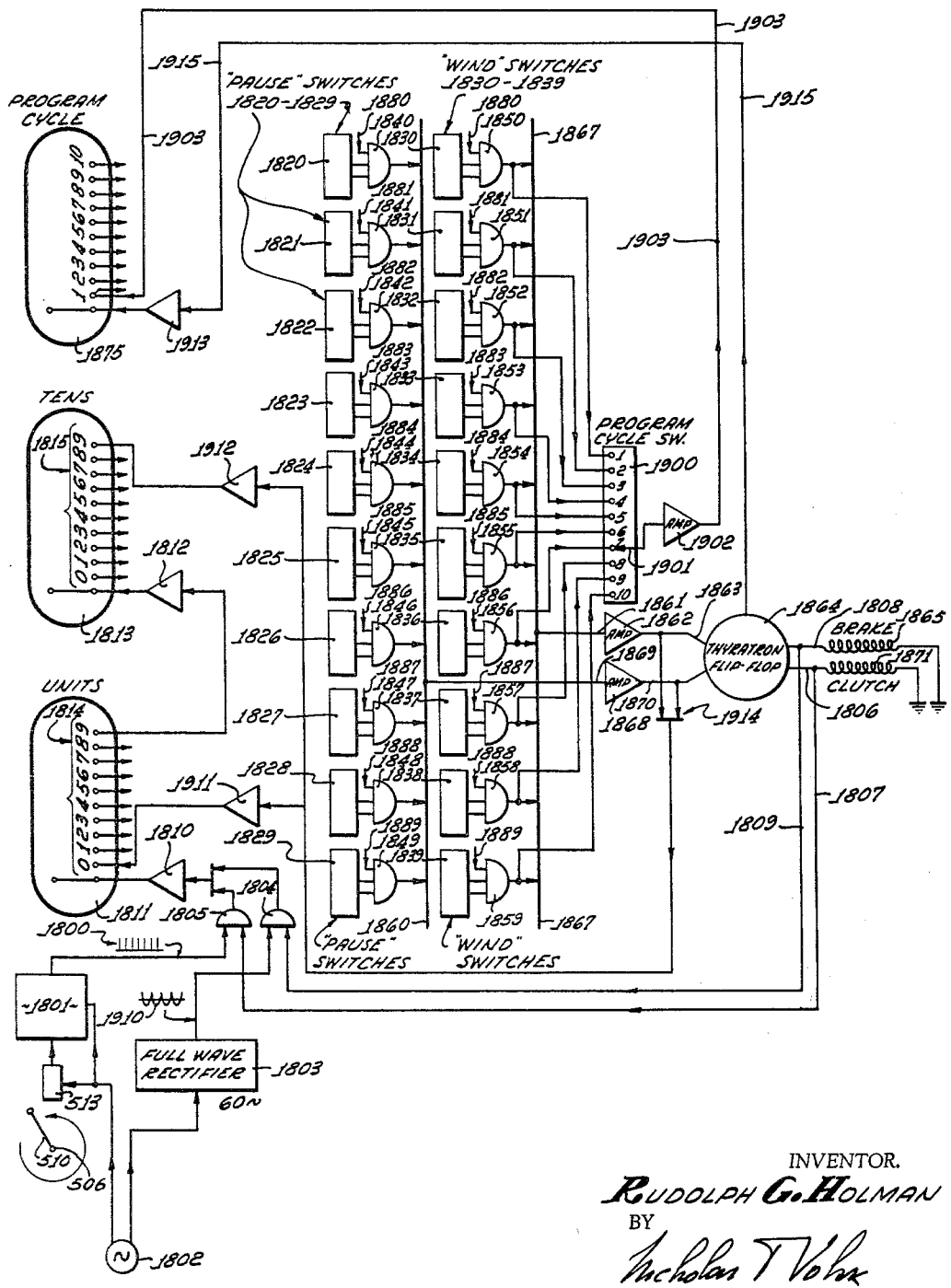
FIG. 18 is a block diagram of the electronic programmer for selecting and, once the selection has been made, controlling the program cycles and the complete cycle.

Referring to FIG. 18, it illustrates an abridged block diagram of the entire programmer. The programmer is controlled by two input signals. The first input signal is signal 1800 which is produced by the revolving magnetic arm 510 and the magnetical pick-up 513 connected to a pulse generating circuit 1801. Devices of the above type are well known in the art and, as a rule, consist of the following elements: Magnetic pick-up 513 consists of a magnetic core with the primary and secondary windings wound upon this core. The primary winding is closed upon itself. The primary winding may be connected to a source of alternating current potential 1802 and the secondary winding is connected to a thyratron phase detector 1801, which is also connected to the alternating current source 1802. The parameters of the primary and secondary circuits are so arranged that the two circuits are in phase opposition with respect to each other when arm 510 is not in the proximity of the magnetic pick-up 513. When the ferro-magnetic arm 510 is in the proximity of the magnetic pick-up 513, the phase relationship of the primary and secondary circuits is altered to a sufficient extent so as to produce a high positive signal on the control grid of the thyratron in the phase detector circuit 1801.

The thyratron becomes conductive only for a very short interval of time corresponding to the duration of the positive portion of the alternating signals and it is then rendered non-conductive by the removal of the plate potential on the plate of the thyratron by the ringing circuit connected in the plate of the thyratron. The resulting positive signal is signal 1800 which occurs once for each revolution of shaft 506. In the example selected for the description of the over-all system, it has been assumed that the two synchronous motors 500 and 168, the gear boxes 502 and 167, as well as the dimensions of the drive wheel 112 are so proportioned as to produce one complete turn such as turn 1 in FIG. 1 of thread 100 on ball B. Therefore, since pulse 1800 is produced by the pulse generator 1801 for each turn of shaft 506, shaft 506 makes one revolution for each complete turn of thread 100 on ball B.

FIGURE 1 illustrates that during one program cycle 6 complete turns are wound on the ball whereupon the winding period is followed by the pause period which is produced by disconnecting clutch 503 and applying brake 505 to shaft 506. It is also necessary to have a timing signal for controlling the pause period. The timing signal for the pause period is obtained by connecting the 60 cycle source 1802 to a full wave rectifier 1803 and then impressing the output of the rectifier on an "and" gate circuit 1804. The "and" gates 1804 and 1805 are controlled by the "clutch" signal appearing on conductors 1806 and 1807 and by the brake signal appearing on conductors 1808 and 1809. The control of the gates 1804 and 1805 is such that when the wind signal gets through gate 1805 the timing signal from rectifier 1803 is blocked and vice versa.

The gates 1804 and 1805 are connected to a "step" amplifier 1810 whose output is connected to the guide pins of a bi-directional glow transfer tube 1811 which has ten stable state cathodes 0 through 9 and two conventional glow transfer pins posted between each cathode. Tube 1811 may be considered as a decimal counting tube for counting the pulses impressed on the guide pins and after counting ten pulses it returns to its original zero position after delivering a pulse to a step amplifier 1812 which is connected to a bi-directional glow transfer tube 1813. This tube is identical to tube 1811; it has ten cathodes 0 through 9 so that it is capable of counting the pulses impressed upon it by the units tube 1811, such as every 10th pulse 1800 or every 10th pulse 1910, depending upon the state of the settings of the pause and wind switches 1820-1829 and 1830-1839.

The cathodes 1814 of tube 1811 are connected in parallel to the "units" contacts of the pause switches 1820 through 1829 and also to the "units" contacts of the wind switches 1830 through 1839. The cathodes of tube 1813 are also connected to the wind and pause switches 1820 through 1839, but in this case the cathodes are connected to the "tens" contacts of the switches. These connections are omitted in the block diagram for its simplification, but are illustrated, in part, in the schematic diagrams and will be described more in detail later.

The outputs of the wind and pause switches 1820 through 1839 are connected to the three-legged "and" gates 1840 through 1859. The outputs of the gates 1840 through 1849 are buffered together to a common conductor 1860 which receives signals from one of the gates 1840 through 1849 at any given instant. Conductor 1860 is connected over a conductor 1869 to an amplifier 1868 and the output of amplifier 1868 is connected over a conductor 1870 to a thyratron flip flop circuit 1864. The output of the thyratron flip flop circuit 1864 is connected to the brake winding 1865 and to the clutch winding 1871 which are the control windings of the brake 505 and clutch 503 illustrated in FIG. 5. The gates 1850 through 1859 are buffered to a common conductor 1867 which is connected to an amplifier 1862 through a conductor 1861.

The outputs of the three-legged "and" gates 1840-1849 and 1850-1859 are controlled, respectively, by the two signals: the first signal is the one produced by the pause switches 1820 through 1829 and the second signal is the one produced by the wind switches 1830 through 1839. The wind and the pause switches are connected to the cathodes of the "units" and "tens" tubes 1811 and 1813. The third signal is impressed on the third leg of all the gates 1840-1859 by conductors 1880 through 1889 which are connected to the cathodes of the program selector tube 1875.

Therefore, the gates 1840-1859, in addition, are also controlled by the program tube 1875 which is identical to the tubes 1811 and 1813. The ten cathodes of tube 1875 are connected directly to the conductors 1880 through 1899. These connections are not illustrated in the block diagram but will be described here as follows: cathode 1 is connected to conductor 1880; cathode 2 is connected to conductor 1881, etc.

The function performed by the program cycle switch 1900 is to select the number of the individual program cycles to be used in the complete cycle. In order to achieve this, the outputs of the gates 1850 through 1859 are connected to the program switch 1900 which has ten positions. Slider 1901 may be shifted to any one of the ten positions. Slider 1901 is connected to an amplifier 1902 and the output of amplifier 1902 is connected through a conductor 1903 to a cathode 1 of tube 1875. When slider 1901, for example, is positioned on contact 6 of switch 1900, gate 1855 delivers a control pulse to amplifier 1902 and this pulse is impressed on cathode 1 of the program cycle tube 1875, thus resetting this tube back to its reset cathode. Such resetting of the program cycle tube 1875 returns the complete cycle back to the gates 1840 and 1850 which control the timing of the first program cycle. Therefore, depending on the setting of the program cycle switch 1900, the complete cycle may have from one to ten program cycles in the complete cycle which repeat themselves until the entire winding of the ball is completed and the synchronous motor 168 is stopped by the counter 172.

Amplifier 1902, whose output is connected through conductor 1903 to the first cathode of tube 1975, is the reset amplifier which returns tube 1875 to its reset position, i.e. cathode 1.

It is also necessary to provide the stepping signal for tube 1875 at the conclusion of each program cycle. This signal is produced by the first thyratron in the flip flop thyratron circuit 1864 whose output is connected in series with the brake winding 1865. Therefore the stepping signal for tube 1875 is produced at the same time the brake signal is impressed on the brake winding 1865 which takes place at the conclusion of each wind cycle, or wind period. In this manner tube 1875 is stepped from one cathode to the next upon the conclusion of each wind period.

Only a brief description of one complete operating cycle will be given in connection with the block diagram because a more detailed description will follow upon the completion of the description of the schematic diagram. This brief description, however, should serve as a helpful introduction for the understanding of the schematic diagram and its operation. The source of alternating power 1802 produces two input signals, one signal is the previously mentioned series of uniformly spaced pulses 1800 which represent the revolutions of shaft 506, one pulse for one complete revolution of shaft 506 being generated by the magnetic pick-up 513 in the manner described previously. The same A.C. source 1802 also produces pulses 1910 which comprise the rectified version of the 60 cycle frequency of source 1802. The fully rectified wave is inverted and the top half of the signal is used as a means for timing the pause period and also for adjusting its duration by means of the pause switches 1820 through 1829. Since the system should respond only to the shaft input signal 1800 during the wind period of the program cycle, it is necessary to interpose the "and" gates 1805 and 1804 whose function is to impress signal 1800 on the tube stepping amplifier 1810 during the wind period and block the 120 cycle signal 1910.

This is accomplished by connecting the gates 1805 and 1804 to the output of the thyratrons 1864, the clutch thyratron being rendered conductive during the wind period and the brake thyratron being rendered conductive during the pause period. These thyratrons furnish the necessary signals to the gates 1805 and 1804 so that only one type of signal is impressed on amplifier 1810 at any given time. It should be mentioned here, if only parenthetically, that strictly speaking it is necessary to gate only gate 1804 rather than both gates because when the brake signal is impressed on the brake winding 1865 and the flow of current through the clutch winding is simultaneously stopped, shaft 506 is immediately stopped and the generation of signal 1800 by means of the revolving arm 510 is also stopped at the same time.

If the description of the program cycle is to begin with the assumption that the cycle begins with the winding period of the cycle, then signals 1800 are impressed on the guide pins of tube 1811 whose cathodes 1814 are connected to the switches 1820 through 1839. It may be remembered that cathode 1 of tube 1811 is connected in parallel to the pause switch 1820 and the wind switch 1830, switches 1820 through 1829 being the pause switches which are used for adjusting the length of the pause period and switches 1830 through 1839 being the wind switches for adjusting the number of turns produced during any given program cycle.

Before proceeding with any further description of the functional cycle of FIG. 18 it should be mentioned here that it will be assumed that the program cycle tube 1875 is set on cathode 1 and therefore the circuit is sensing the wind gate 1850. It will be assumed also that the program cycle switch 1900 and its slider arm 1901 is set on position 10 with the result that the complete cycle will include ten wind periods and ten pause periods. Therefore, the operation of the programmer will include the operation of all the pause switches 1820 through 1829, all the pause gates 1840 through 1849, all ten wind switches 1830 through 1839 and all the wind gates 1850 through 1859.

The first pulse 1800 reaching tube 1811 steps it from cathode zero to cathode 1 with the result that a pulse is impressed by cathode 1 of tube 1811 on position 11 (see FIG. 20, switch 1820, conductor U1, and contact 11) of the ten wind and the ten pause switches. These connections will be described in more detail in connection with the description of FIG. 20 and pause switch 1820 illustrated more in detail in FIG. 20 therefore it will be stated here only briefly that a signal is transmitted by only one "and" gate 1840 through 1859 at any given instant only when three signals appear simultaneously on the three input leads connected to the input side of each gate circuit. Since the "and" gates are three-legged gates, they require three co-phased signals for producing an output signal in their output.

These three gate signals are impressed on these gates by the three tubes 1811, 1813 and 1875 in the manner described below. It has been already mentioned how cathode 1 of tube 1811 impresses its signal on one specific contact, contact 11, FIG. 20, of all the pause and all the wind switches. If switch 1820 is set on position 11, (in FIG. 20 sliders 2000 and 2001 are on contacts 5) two of the input conductors (U1 and T1 in FIG. 20) of gate 1840 are directly connected to the cathodes "1" of the transfer tubes 1811 and 1813. Since tube 1811 is a "units" tube and tube 1813 is the "tens" tube, i.e. tube 1811 responds to each pulse and tube 1813 responds to each tenth pulse, these two tubes will deliver a pulse to switch 1820 at the same time only when eleven pulses have been counted and cathodes 1 of tube 1811 and cathode 1 of tube 1813 are energized.

Also, in order to obtain a signal in the output of gate 1840, it is also necessary to obtain an output signal from cathode 1 of tube 1875. Since the block diagram does not indicate the actual connections of the switches but these connections are shown in FIGS. 19 through 21, it is best to defer the detailed description of the switch connections to that given in connection with the schematic diagram. Suffice to say that when the program cycle switch is set on position 1, and the switches 1820 through 1839 are set in any position from two through 20, it will be possible to obtain one output signal, or pulse, in the gate circuit and conductor 1869 upon the completion of the wind cycle, or period. This pulse is impressed on the grid of the thyratron which is connected in series with the brake winding 1865, thus energizing this thyratron and de-energizing the clutch thyratron which supplies current to the clutch winding 1871. Accordingly, the clutch winding 1871 will be de-energized, the brake winding 1865 will be energized, rotation of shaft 506 will be stopped by brake 505 and the wind portion of the first program cycle will be completed and it will be immediately followed by the pause portion of the cycle.

The reversal of the positions, or of the conductivities, of the thyratrons 1864 produces the required gating signals which are impressed through conductors 1809 and 1807 on the "and" gates 1805 and 1804 with the result that amplifier 1810 will now receive the 120 pulses per second signal 1910 from the full wave rectifier 1803. The control of the entire programmer at this time, during the pause period, will be governed by the pause signals 1910 and the setting of the pause switches, the position of the switches determining the number of the pulses which will be required for restoring the state of the conductivity of the flip flop thyratron circuit 1864 to its original state. The pause switches have from two to 20 positions and therefore the number of the 120 cycle pulses which will be required for operating the flip flop circuit may be manually varied from two pulses to twenty pulses.

Accordingly, the length of the pause period may be varied from 1/60 of a second to 1/6 of a second. Similarly the wind switches also have position setings from two to 20 and therefore the wind cycle may be set so as to produce from two turns per program cycle to a maximum of 20 turns for each program cycle. It is assumed here, as before, that one complete turn is produced on ball B for each pulse 1800.

The only remaining part of the block diagram that needs to be described here for completing the description is switch 1900 and the program cycle tube 1875 whose cathodes are connected to the third conductors of the "and" circuits 1840 through 1859. Depending upon the setting of switch 1900, which has ten positions, or contacts, either one or one through ten program cycles are included in the complete cycle. Accordingly, this switch enables one to vary the number of the program cycles included in one complete cycle. This is accomplished by setting the slider 1901 to any one of the ten contacts, which selects that cathode of the program cycle tube 1875 which delivers the reset pulse to tube 1875. For example, in FIG.

18, slider 1901 is positioned on contact 7. Therefore, only gate 1856 can produce a pulse which will get through switch 1900, contact 7, slider 1901, amplifier 1902, conductor 1903 and cathode 1 of tube 1875. When a negative pulse is impressed on cathode 1 in the above manner, the ionization is transferred directly from cathode 7 to cathode 1 and the next complete cycle, with seven program cycles, will begin to repeat itself indefinitely as long as the synchronous motor 168 remains connected to the 60 cycle source. As mentioned previously, motor 168 is controlled by the counter 172 which is operated by a timer also connected to the same 60 cycle source. When counter 172 receives a predetermined number of pulses, it disconnects motor 172 from the 60 cycle source and the winding station comes to rest. This indicates to an operator that the ball has been wound and should be replaced with the next ball.

SCHEMATIC DIAGRAM
Of the programmer

Referring now to schematic diagram of the programmer, it includes FIGS. 19, 20 and 21 which should be placed with respect to each other in the manner indicated in FIG. 22 for proper reading of the entire diagram.

FIG. 19 includes the following elements: the magnetic pick up 513 which acts as a source of pulses 1800, the source 1802 of the 120 pulses per second, the "and" gates 1804 and 1805, which are indicated as diodes 1927–1929 and a diode 1934, respectively, the "units" tube 1811, the "tens" tube 1813, the step amplifier 1812, and the reset amplifiers 1911 and 1912 which are also shown in FIG. 18 and bear the same numerals.

FIG. 20 includes the pause switch 1820, the three-legged gates 1840 through 1859 and the amplifiers 1862 and 1868.

FIG. 21 includes the thyratron flip flop circuit 1864, the brake winding 1865, the clutch winding 1871, amplifier 1902, amplifier 1913, the program switch 1900 and the buffer circuit 1914.

Referring now to FIG. 19, the alternating current source 1802 is connected to the primary winding 1916 of the step-down transformer 1917. The secondary 1918 of transformer 1917 is connected to a full wave rectifier circuit which includes diodes 1919 and 1920, resistors 1921 through 1924 and the center tap connections. The output of the rectifier is impressed on an isolating capacitor 1925 with the result that signal 1910 appears at the junction point 1926. Diode 1927 and conductor 1928 are connected to the cathode of thyratron 2100 (see FIG. 21) which is one of the thyratrons of the flip flop circuit 1864. The second thyratron is thyratron 2101, FIG. 21.

The cathode-anode circuit of thyratron 2100 is connected in series with the brake winding 1865 and therefore it is that thyratron which becomes energized during the pause period. When thyratron 2100 is non-conductive, no current flows through a cathode resistor 2102 of thyratron 2100 with the result that conductor 1928 is at a relatively low potential with respect to ground. Therefore, the timing signals 1910 are shorted to ground through diode 1927, conductor 1928, resistor 2102 and a grounded biasing battery 2135. When thyraton 2100 becomes conductive, the IR drop across the cathode resistor 2102 of thyratron 2100 produces a positive blocking signal on conductor 1928 with the result that the 120 cycle pulses 1910 are no longer shunted to ground through diode 1927, with the result that they are impressed on diode 1929 and conductor 1930 which is connected to the grids of the stepping amplifier 1810. Amplifier 1810 includes a twin triode 1931–1933. The plate of triode 1931 is connected directly to a guide pin G1 of the "units" counting tube 1811 and the plate of triode 1933 is connected to the second guide pin G2 of the "units" counting tube 1811. Diodes 1927 and 1929, therefore, act as two-legged "AND" gate.

A phase delay network 1932–1951 is connected between conductor 1930 and the grid of triode 1933 so as to produce a delayed pulse in the cathode-plate circuit of triode 1933 for stepping the ionization from guide pin G1 to guide pin G2 throughout the stepping cycle of tube 1811.

The "units" counting tube 1811, and especially its guide pins G1 and G2, are also connected to the "wind" signals 1800 through a diode 1934 which impresses these signals on the triodes 1931 and 1933 when shaft 506 is revolving. Signal 1800 is blocked from other circuits by diode 1929. Diode 1934 blocks signal 1910 from the pulse shaper 1801 during the pause period. Diode 1934, therefore, acts as a one-legged diode. It is possible to use a one-legged diode here because no pulses 1800 are produced by the pulse generator 513–510–506. When the pulse generator 513–510–506 is replaced with a constant frequency source, then the gate circuit should be identical to that for the signals 1910. Such circuit is illustrated in FIG. 18, where gate 1805 is connected to conductor 1807 as well as the source of signals 1801, conductor 1807 furnishing the signals for periodically eliminating the signal from source 1801. Accordingly, tube 1811 is stepped from cathode "0" to cathode 9 either by the signals 1910 or 1800 at any given time with the result that signals are impressed on conductors U0 through U9 which are connected to the similarly numbered conductors and terminals, or contacts, of all ten "wind" and all ten "pause" switches 1820 through 1839.

Only one switch 1820, which is the first pause switch, is illustrated in FIG. 20. Examination of the connections of this switch indicates that cathode "0" of tube 1811 is connected to the terminals 10 and 20 of the left side, or the "units" side, of the switch; cathode 1 is connected to terminal 11 through a conductor U1; cathode 2 is connected through a conductor U2 to terminals 12 and 2, etc. as indicated in the schematic diagram. As will be explained later, it is possible to obtain from 1 to 20 turns of the winding on a ball, depending on the setting of the sliders 2000 and 2001, even though the "units" contacts are connected in parallel. This will be described later in connection with a more detailed description of FIG. 20 and switch 1820.

The cathodes 1 through 9 of tube 1811 are also connected to a common conductor 1954 through the biasing resistors and through a conductor 1935 to a grounded biasing source 1936. Conductor 1954 is also connected to a resistor 1937 and a diode 1938 which are a part of the biasing circuit.

Ionization of tube 1811 is returned to the "0" cathode by impressing a negative pulse on cathode "0" at the conclusion of any given pause or wind period. This transfer, or returning, of the ionization to the "0" cathode is accomplished from any cathodes 1 through 9 of tube 1811. Stated differently, the ionization is transferred to the "0" cathode by means of the circuit, which is described below, irrespective of the position of the ionization on the remaning cathodes, such as cathodes 1 through 9, the negative pulse having a sufficiently large negative amplitude so as to accomplish the above transfer. The circuit for accomplishing this transfer is as follows: the cathode of the wind and pause thyrtrons 2101 and 2100 are connected over conductors 2140 and 2141 to two differentiating networks. One differentiating network, connected to the cathode of the "pause" thyratron 2100 through conductor 2141, includes a capacitor 2109 and a grounded resistor 2103. The second differentiating network includes a capacitor 2104 and a grounded resistor 2107, which are connected to the cathode of the "wind" thyratron 2101 through conductor 2140. The time constant of these differentiating networks are such that they produce a positive and a negative pulse only at the time the conductivities of these two thyratrons is alternated; namely when, for example, the "wind" thyratron 2101 is made conductive by the positive pulse impressed on its grid 2108 and the "pause" thyratron 2100 is rendered non-conductive by the removal of the plate potential by the cross-coupling condenser 2109 which, at this instant, impresses a negative pulse on the plate of the "pause" thyratron 2100 because of the drop in the plate potential impressed on the plate of thyratron 2101 after it becomes conductive. The negative pulse, produced by the differentiating neworks at this instant, is blocked by the buffer diodes 2105 and 2106, which are connected on one side to the respective differentiating networks and on the other side to the outgoing conductor 1947. The positive pulse, however, is transmitted by these diodes to conductor 1947. Conductor 1947 is connected to the grids of the two resetting amplifiers 1956 and 1948, with the result that both of these resetting amplifiers are rendered conductive every time there is a change in the conductivities of the thyratrons 2101 and 2100. Amplifier 1956 resets tube 1811 while amplifier 1948 resets tube 1813 to cathode 9, as will be described more in detail later. When the resetting amplifier 1956 is made conductive, its plate potential is lowered and this change in the conductivity of triode 1956 delivers a negative pulse through a coupling capacitor 1957 to conductor 1939 which is connected to the "0" cathode of tube 1911. This negative pulse produced by the thyratrons, the differentiating network and resetting amplifier 1956, resets the ionization in tube 1811 back to cathode "0."

This same negative pulse also delivers a negative pulse to the cathode 9 of tube 1813 through amplifier 1948 and capacitor 1946, thus transferring the ionization in tube 1813 to cathode 9 upon the conclusion of each wind and pause period. The functioning of tube 1813 and the transfer of the ionization in this tube will be described in more detail below. Suffice it to say at this time that upon the transfer of the ionization to the cathode 9 in tube 1813, it is then immediately transferred to the "0" cathode. From the above, it follows that the transfer of the ionization back to the "0" cathodes takes place simultaneously in tube 1811 as well as in tube 1813 at the end of each pause and each wind periods.

Since there are twenty positions, or contacts, on each side of switch 1820 illustrated in FIGURE 20, and twenty contacts on each side of all the remaining switches 1821 through 1839, (see FIG. 23) and it is necessary to count up only through twenty with the aid of the tubes 1811 and 1813, and since tube 1813 responds only to every tenth phase, it is necessary to utilize in switch 1820 and the diode gates 1840 through 1859 only three cathodes which are numbered "0," "1" and "2" of the "tens" tube 1813. Therefore, the remaining cathodes "3" through "8" are connected together to a conductor 1955, a resistor 1945 and a source of biasing potential 1956 and are effectively A.C. grounded through resistor 1945. The ninth cathode is used only for resetting the tube to its original position. This is accomplished by connecting cathode "9" to a resetting amplifier 1912 so as to produce the setting of tube 1813 first to the "9" cathode and then from the "9" cathode to the zero cathode. This resetting is accomplished as follows: Since resetting of tube 1811 produces a carry signal and steps tube 1813 from cathode "9" to cathode "0," this resetting of tube 1813 from the cathode "0," "1," or "2" to cathode "9" at the end of the wind or pause cycle is accomplished by connecting cathode "9" through capacitor 1946 to the plate of a resetting triode 1948 which is normally biased so as to be non-conductive. The grid of this triode is connected through a conductor 1947 to the buffer network 1914.

When there is a change in the conductivity of the thyratron 2101 or thyratron 2100, a positive pulse is impressed by either one of the differentiating networks through the buffer diode 2105 or 2106 on conductor 1947 and the grid of triode 1948 with the result that triode 1948 becomes conductive, thus lowering the plate potential and the potential appearing on capacitor 1946. Accordingly, capacitor 1946 impresses a negative pulse on cathode 9 through capacitor 1946 with the result that the ionization is transferred directly from cathode "0," "1" or "2" to cathode "9" and the cathodes 3, 4, 5, 6, 7 and 8 are skipped during this transfer.

The ionization in tube 1813 is then transferred from cathode 9 back to cathode 0 by the carry signal produced by the "units" counting tube 1811.

In this manner the "units" tube 1811 and the "tens" tube 1813 are reset to the zero cathodes positions upon the completion of the pause period or upon the completion of the wind period, so that each period, whether it is pause or wind, in each program cycle always begins with the two transfer tubes 1811 and 1813 in their reset positions, the ionization in both tubes being reset to cathode "0."

Referring once more to the first pause switch 1820, it includes two rows of contacts, both rows having twenty contatcs. The left row will be called the "units" row because they are connected to the cathodes 0 to 9 of the "units" transfer tube 1811 while the right row will be called "Tens" row because the right side contacts are connected to the cathodes of the "Tens" counting, or transfer, tube 1813. The connections between the cathodes of tube 1813 and the contacts of switch 1820 are as follows: The switch contacts 2 through 9 are all connected in parallel to a conductor "to," letter T indicating that this connection leads to the cathode of the Tens tube 1813 and 0 indicating that it is connected to the 0 cathode of that tube. Switch contacts 10 through 19 of the Tens switch are also connected in parallel to a conductor T1 which connects all of these contacts to cathode 1 of tube 1813. The last contact 20 is connected through a conductor T2 to cathode 2 of tube 1813. Switch 1820 has two sliders 2000 and 2001 which are mechanically connected to each other as indicated by a dotted line 2002, with the result that both sliders are positioned on the similarly numbered contacts of the "units" and the "tens" portions of the switch as indicated in the figure. It has been already stated previously that since the units contacts 2 through 20 are connected in the manner indicated in the figure, it is possible to obtain ten unit numbers on slider 2000 by moving slider 2000 from one extreme to the other of the "units" portion of the switch. This does not mean however that because of the above type of connections on the left side of the switch that it will be possible to obtain only from two to ten turns of winding in each program cycle. Since the units part of the switch works in synchronism with the tens portion of the switch, and the sliders 2000 and 2001 are connected to the three-legged "and" circuit, the "and" circuit will respond only when two signals appear simultaneously on the sliders 2000 and 2001 as well as an additional signal simultaneously appears from or is impressed by the programming circuit which need not be discussed at this time. Accordingly, by connecting the contacts 2 to 9 in parallel and contacts 10 to 19 also in parallel and then connecting the first group of the contacts to cathode 0 and the second group to cathode 1, it is possible to vary the number of the turns in the individual program cycle from two to twenty turns by using the tens tube 1813 for separating, so to speak, one group of contacts on the units switch from the second group insofar as the function is concerned. Accordingly, the signals appearing on the units contacts 2 to 10 are differentiated by the second tube 1813 from the signals appearing on the contacts 11 through 20.

The above may be summarized in a somewhat simpler manner by stating that the type of connections used in switch 1820 enable one first to use the units tube 1811, which has only ten cathodes, for accomplishing the selection of turns from two to twenty. Therefore, the above connections enable one to use the units tube with only ten cathodes and still accomplish the selection identical to that which would be possible with the tube having twenty cathodes.

Sliders 2000 and 2001 are illustrated on contacts 5 of the two switches. Such setting of the switch establishes a direct connection with the fifth cathode through the units switch and diode 2005 of the three-legged "and" circuit 1840 which is the first pause gate. The second diode 2006 is connected to slider 2001 which connects this diode to the 0 cathode of the tens tube 1813. Accordingly, with this setting of the sliders, gate 1840 will simultaneously receive two signals at the diodes 2005 and 2006 when the ionization in the units tube 1811 rests on cathode 5 and on cathode 0 in tube 1813.

In order to make gate 1840 non-conductive, it is also necessary to impress the signal at this time on diode 2007 through a conductor 1880 which appears in FIGS. 20, 21 and 18, and bears the same numeral given to this conductor in FIG. 18. It should be mentioned here parenthetically that this type of numbering also applies to all the remaining third conductors of the three-legged gates. Conductor 1880 is connected to the first cathode of the program cycle tube 1875. From the prior description of this tube, it may be remembered that ionization will rest on cathode 1 of tube 1875 during, by definition, the first program cycle, at which time the program cycle tube 1875 energizes the first pause gate circuit 1840 and the first wind gate circuit 1850. All of the gates are energized from a source 2008 through the appropriate pull-up resistors, such as resistors 2010 and 2011. All of the gates are connected in parallel with respect to the following circuit: grounded source 2008, conductor 2012, pull-up resistor 2010, diode 2020, conductor 2040, grid resistor 2042 and grounded biasing source 2043. When gate 1840 is non-conductive, the impedance looking back into gate 1840 is equal to infinity (for the purpose at hand), while the impedance of the circuit including conductor 2040 is determined by the value of the resistor 2042 and the pull-up resistor 2010 which is connected in parallel with both circuits. Accordingly, at this time, when gate 1840 is non-conductive, the potential impressed on grid 2045 of triode 1862 is such as to make it highly conductive. Triode 1862 corresponds to the similarly numbered amplifier 1862 in FIG. 18. This is the amplifier which is used for triggering one of the thyratrons by impressing the positive pulse on conductor 1863 which is connected to the cathode of triode 1862 through capacitor 2046. Triode 1862 is a cathode follower, with conductor 1863 being coupled to the cathode through a capacitor 2046 and resistor 2047, the values of this capacitor-resistor combination being such as to make it also act as a differentiating network. This differentiating network produces a sharp positive pulse at the leading edge of the first pulse which is produced on grid 2045 of triode 1862 during the wind or pause portion of the cycle. This positive pulse is transmitted over conductor 1863 to the control grid of thyratrons 2108, making it conductive at this time, which at once energizes the winding 1871 of the clutch, de-energizes thyratrons 2100 through a cross-coupling capacitor 2109, which, in turn, de-energizes the brake winding 1865. This starts the winding cycle. The above conditions take place when gate 1840 is enabled, i.e., when all the diodes of gate 1840 are non-conductive. When any one of these gates is conductive, it becomes connected in parallel with source 2008, resistor 2010, and conductor 2040, etc. Since the impedance looking back into the gate 1840, when it is conductive, or open, is much lower as compared to when it is non-conductive, or closed, the voltage impressed on conductor 2040 and grid 2045 is lowered when the gate is opened, with the result that the cathode follower 1862 will become less conductive and, therefore, this cathode follower will impress a negative pulse on conductor 1863 and control grid 2108 of thyratron 2101. This negative pulse, however, is not able to render thyratron 2101 non-conductive at this time because cross-coupling capacitor 2109 had already assumed the steady state potential and, therefore, the plate of this thyratron remains positive at this instant. Accordingly, the negative signal on the grid has no effect on this thyratron.

In view of the description of the connections and functioning of the first pause gate circuit 1840, cathode follower 1862 and thyratron 2101, it is unnecessary to describe in detail the functioning of the first wind gate circuit 1850 which is connected over a conductor 2050 and diode 2030 to the grid 2051 of the cathode follower 1868, since this circuit functions in identical manner as the previously described pause circuit. Suffice it to say that the cathode follower 1868 is connected to the control grid 2110 of the pause thyratron 2100 which is rendered conductive the next time the winding gate 1850 is enabled. From the above description of the connections of the gate circuits and the thyratrons 2101 and 2100, it follows that thyratron 2100 is rendered conductive at the conclusion of the wind cycle, and thyratron 2101 is rendered conductive at the conclusion of the pause cycle. The remaining gates 1841 through 1859 function in the same manner as gate 1840 and, therefore, need no description. It should be noted here that FIG. 20 illustrates only one switch such as 1820. Since there are twenty gates (1840 through 1859) there are twenty switches altogether of the type shown at 1820.

Referring now more specifically to FIG. 21, the description of the thyratron circuits may be readily concluded at this time by stating that resistors 2112 and 2113, and diodes 2114 and 2115 constitute no more than a damping network for the brake and clutch windings 1865 and 1871 which have relatively high inductive reactance. A glow tube 2116 is a neon lamp for indicating the energization of clutch 1871 and a glow tube 2117 is a neon lamp for indicating the energization of the brake winding 1865. The buffer differentiating network 1914, whose inputs are connected to the respective cathodes of the two thyratrons, has been described previously and therefore needs no additional description.

It now remains only to describe the circuits of the program control system which includes the program-selecting tube 1875 and the program-selecting switch 1900. The guide pins G1 and G2 of tube 1875 are connected to the plates of the triodes 2120 and 2122. The grids of these triodes are connected to the cathode of thyratron 2101 over conductor 1915. Triodes 2120 and 2122 correspond to the previously described stepping amplifier 1913. The operation of amplifier 1913 is identical to the previously described pin-amplifier 1810 and, therefore needs no additional description. The connections of the cathodes of the program-selecting tube 1875 are indicated in FIG. 21; cathode 1 is connected to the first wind and the first pause gates as indicated in FIG. 20. This connection has been described previously in connection with the description of these gates. The remaining cathodes 2 through 10 are connected to the corresponding pause and wind gates illustrated in FIG. 20 in the same manner as the connections of the diodes 2007 and 2055. Accordingly, the program selecting tube 1875 controls all of the gates, in the manner described previously, by supplying the third pulse for the third leg of each gate for enabling the gates at the time when the other two legs are enabled.

The only remaining part of the program selecting circuit to be described is the circuit which re-sets the program selecting tube 1875. This tube is the tube which enables one to vary or select the number of program cycles contained in the complete cycle. This tube is stepped cathode 1 to cathode 10 by means of the signals produced by the triodes 2120 and 2122, which in turn are controlled by the thyratron 2101. When slider 1901 is on contact 10, ten program cycles are included in the complete cycle and when slider 1901 is on any other contact of switch 1900, then the number of the program cycles included in the complete cycle corresponds to the number of the contact. In order to achieve the latter, it becomes necessary to reset tube 1875 back from any cathode two through ten. This is accomplished by using coincidence circuit 1902 which includes pentode 2130. The control grid 2131 of this pentode is connected through a capacitor 2132 to the cathode of thyratron 2101 through the conductor 1915 which impresses a positive pulse on the control grid 2131 when thyratron 2101 becomes conductive. The second positive pulse is impressed on the second grid 2133 from any one of the cathodes under control of the program selecting switch 1900, and when the two positive pulses appear simultaneously on the two grids of this pentode, it is rendered conductive. The second grid 2133 is connected to slider 1901 through a resistor 2138, and conductors 2139 and 2140. Capacitor 2141 and resistor 2138 constitute an integrating network so that the leading edge of the pulse appearing on the grid 2131 is used for making pentode 2130 conductive. The plate of pentode 2130 is coupled to cathode 10 by a capacitor 2137. Therefore, when pentode 2130 becomes conductive, capacitor 2137 produces a negative pulse on cathode 10 of tube 1875, thus transferring the ionization to cathode 10. The ionization is then immediately stepped back to cathode 1 by the pulse signal appearing on conductor 1915 which is transmitted by the guide pins G1 and G2 through the stepping amplifiers 2120 and 2122. It thus follows that, by setting slider 1901 on switch 1900 on any one of contacts 1 through 10, it is possible to select any number of program cycles in a complete cycle, i.e., from one program cycle, which is the minimum, and up to ten program cycles, which is the maximum.

From the above description of the programmer, its operation may be summarized briefly as follows: The electronic programmer basically is a digital interval timer which is capable of counting twenty sequential time periods. The timer operates a flip-flop circuit including the wind thyratron 2101 and the pause thyratron 2100, which are switched at the end of each predetermined time interval. Two sources of pulses are used for operating the digital interval timer. One source is the full wave rectifier 1803 which furnishes the 120 cycles per second pulses 1910 for timing the duration of the pause interval, or period, in each program cycle. The second source is the rotating arm 510 and the magnetic pick-up 513 which produce a single pulse 1800 for each revolution of shaft 506. In the illustrated system, with the ball making one complete revolution during one complete revolution of shaft 506, one pulse 1800 is produced for each complete turn of the thread wound on the ball. The number of turns produced on the ball during each wind interval, or period, is obtained by counting the pulses 1800 by means of the digital interval timer. Accordingly, the function of the digital interval timer is to count the 120 cycle pulses until a predetermined count is reached. At this time, the output of the flip-flop thyratrons 2101 and 2100 is such that the pause thyratron 2100 is conductive and therefore current flows through the brake winding 1865. At the conclusion of the pause period, the timer begins to count the wind pulses 1800 and the flip-flop circuit is reset to the position in which the "wind" thyratron 2101 becomes conductive and the pause thyratron 2100 becomes non-conductive. Accordingly, during this interval, current flows through the clutch winding 1871. The timer then counts a predetermined number of wind pulses, whereupon the second program cycle is begun in the same manner as described above. In the disclosed digital interval timer, as indicated in FIGURES 18 through 23, it is possible to have a maximum of ten program cycles. From the description of the programmer, it is obvious that the number of the program cycles included in the complete cycle can be increased beyond ten by increasing the number of the cathodes in tube 1875, the number of the pause and wind gates and switches and the number of the contacts on switch 1900. It is rather difficult to visualize, however, an occasion which would require such increase in the maximum number of the program cycles that can be included in the complete cycle, since the ten program cycles used in the disclosed programmer already offer a very large number of possible combinations for producing any imaginable variety of windings.

It may be helpful to describe at this time more in detail the front panel of the programmer which is illustrated in FIG. 23. The panel includes the usual "on" and "off" switches 2300 and 2301, one switch being for the alternating current from the alternating current source 1802 and the other switch being for the direct current source. The power busses provides the current to the conventional indicating lights 2302 and 2303. The glow transfer tubes appear at 1811, 1813 and 1875. The panel is also provided with the "wind" and "pause" indicating lights 2116 and 2117, which indicate the conductivities of the thyratrons 2100 and 2101. The remaining portion of the panel is occupied by the wind and pause switches which are positioned on the panel in such a manner that the two switches for the first program cycle are next to each other with the wind switch being on top of the pause switch. Each switch is provided with an indicator arm, such as arm 2306, which is mounted on a shaft 2307 of the selector switch. Shaft 2307 has two contact arms which correspond to the contact arms, or sliders, 2000 and 2001 illustrated in FIGURE 20. Since the complete cycle may include the maximum of ten program cycles, there are ten wind switches and ten pause switches illustrated in FIGURES 18 and 23. The pointers or the indicating arms, such as arms 2306 and 2308, can be positioned in any position from the "off" position through the "20" position, and according to this setting, the programmer will count the number of the pulses for each given period, as described previously. The panel also includes the dial for the program selector switch 1900. The dial of switch 1900 has ten positions corresponding to the 10 cathodes used in the program cycle tube 1875. The functioning of this switch has been described before in connection with the description of FIGURES 18 and 21, and, therefore, it needs no additional description.

Returning once more to the operation of the programmer, the source of the 120 cycle pulses 1910 is connected to the programmer continuously and, therefore, it becomes necessary to interpose a gate circuit including diodes 1927, 1929 and 1934, which permit signal 1910 to reach the grid of diode 1921 only when the pause thyratron 2100 is conductive and the wind thyratron 2101 is non-conductive. The control signal for this gate circuit is furnished by the cathode of the pause thyratron 2100 through conductor 1928. A positive signal is impressed on the cathode of diode 1927 at this time with the result that it offers a high impedance to signals 1910. Therefore, the pause signals 1910 are transmitted through the stepping amplifier 1931–1933 to the transfer tube 1811 and the guide pins G1 and G2. Tube 1811 counts these pause signals and its cathodes transmit the pause signals to the pause switches, such as switch 1820. Depending upon the setting of the sliders 2000 and 2001, the three-legged "and" gates, such as gates 1840 through 1859, become non-conductive when three signals are impressed simultaneously on the three conductors which connect the three gate diodes 205, 206 and 207 to the sliders 2000 and 2001 and to the cathodes of the program tube 1875. The setting on switch 1820 determines the number of pulses which will be required for producing two pulses simultaneously on the diodes 2005 and 2006. For instance, according to the setting illustrated in FIGURE 20, two simultaneous pulses will be produced on the above two diodes after five pause pulses 1910 are impressed on the glow transfer pins of tube 1811. The program selector tube 1875 is controlled by the tubes 1811 and 1813 through the control of the thyratrons 2100 and 2101 by these counter tubes. Every time thyratron 2101 is made conductive at the beginning of the wind cycle, a positive pulse is impressed on the stepping amplifier 1913 (triodes 2120 and 2122) which transfers ionization to the next cathode of the program tube. Therefore, tube 1875 is stepped to the next cathode at the beginning of each program cycle and in this manner the operation of the three tubes is synchronized in the proper manner, i.e., every time the tubes 1811 and 1813 impress the two signals on gate 1840, the third diodes 2007 and diode 2055 in the two gates 1840 and 1850 are kept in a non-conductive state throughout the duration of the first program cycle. A pulse is delivered by gate 1840 when two pulses are simultaneously impressed through switch 1820 by the tubes 1811 and 1813. The latter takes place when the two cathodes in the two tubes, as determined by the switch 1820, are simultaneously true, i.e. are conductive and the third pulse is impressed simultaneously by the program tube 1875. The connections between the cathodes of tube 1811 and the switches 1820 through 1839 are illustrated by the connections of switch 1820 and there are altogether twenty identical connections between the cathodes of the tubes 1811 and 1813 and the twenty switches 1820–1839. Therefore, the signals produced by any individual cathode of the above tubes 1811 and 1813 reach an appropriate contact or contacts of the switches 1820 and 1839. If the sliders of the switches are connected to the contact receiving the signal, then this signal will be transmitted beyond the switch to the corresponding first two gate diodes, such as diodes 2006 and 2007, which will enable these two diodes. If, for example, it is assumed that all the sliders, such as 2000 and 2001, on all the twenty switches 1820–1839 are set on contacts "5," then all twenty "units" and "tens" diodes, such as 2005 and 2006, will be enabled. However, since the gates 1840–1959 are three-legged gates and require the stimultaneous enabling of the third "programming" diode, such as diode 2007, only two gates will be enabled, one "pause" and one "wind" gate, and the enabled gates will be those which will also receive at this time the third "programming" signal from tube 1875 so that all six diodes of the two gates will become non-conductive at the same instant. The two gates thus will be enabled. The third or the "programming" signal, which is obtained from tube 1875, appears on that pair of gates whose number corresponds to the number of the program cycle on switch 1900. Accordingly, if it is also assumed that the slider 1901 is on contact "5" of switch 1900, then only the first five gates will ever be enabled because only the first five pause and wind gates are included in a complete program cycle. It has been already stated on several occasions previously, that the three transfer tubes are so synchronized that when the ionization of the transfer tubes 1811 and 1813 proceeds in the normal manner through the first wind and pause periods, then the ionization of tube 1875 rests, throughout this entire first program cycle, on cathode "1," thus making the third diodes 2007 and 2055 of the gates 1840 and 1850 non-conductive during the first program cycle. Accordingly, when these gates also receive the "unit" pulses during this period of time from tube 1811 and the "tens" signal from tube 1813, then they will become enabled via the switches 1820 and 1830. The enabling of the gates, therefore, will proceed from the first program cycle to the next until the fifth program cycle is completed, at which time the ionization of the tube 1875 will be transferred from cathode "5" back to cathode "1" in the manner described previously, with the result that the complete cycle will consist of only five program cycles which will repeat themselves indefinitely as long as the programmer is in operation.

From the above description of the programmer, it follows that it is necessary to have the "tens" tube in order to obtain from two to twenty selections on the pause and wind switches even though the tube 1811 has only ten cathodes, which is the maximum number of cathodes presently available in a tube of this type. Such a limitation in the number of the cathodes by the manufacturers of these tubes is for the simple reason that it is always possible to combine the number of tubes in the manner indicated in the programmer for obtaining as many selections and combination as one wishes to have by combining two or more tubes in the circuits disclosed here.

It is necessary to have three-legged gate circuits in order to enable one to use the same pair of the counting tubes 1811 and 1813 for all ten program cycles. If, for instance, the gates were transformed into two-legged gates, then it would be necessary to use a pair of counting tubes, such as tubes 1811 and 1813, for each pair of gates or each program cycle with the corresponding complexities in the input circuit and the stepping and resetting amplifiers.

The introduction of the three-legged gates at once requires the introduction of an additional transfer tube, which is tube 1875. This tube enables one not only to use two pairs of the counting tubes 1811 and 1813 for all the gates, but it also enables one to vary the number of the program cycles which are included in the complete cycle. Accordingly, the disclosed programmer accomplishes the maximum degree to versatility with the minimum number of electronic components and permits one to use the simplest synchronization system between the electronic components and the simplest input circuits for achieving the above-mentioned maximum versatility.

What is claimed as new is:

1. A programmer for controlling the operation of a ball winding machine following a repeated sequence of operation including a wind period followed by a pause period, a plurality of wind and pause periods included in a single complete cycle, and a plurality of complete cycles repeated a predetermined number of times for completing the entire winding on said ball, said programmer including
    (a) a first source of wind pulses for timing the durations of individual wind periods included in said complete cycle,
    (b) a second source of pause pulses for timing the duration of individual pause periods included in said complete cycle,
    (c) first pulse-counting means,
    (d) second means sequentially connecting said first source and then said second source to said first pulse counting means,
    (e) a first set of wind switches connected to said first counting means,
    (f) a second set of pause switches connected to said first counting means,
    (g) a first set of three leg wind gates corresponding to and connected to the respective switches of said first set of wind switches,
    (h) each gate of the first set having first, second and third legs,
    (i) a second set of three leg pause gates corresponding to and connected to the respective switches of said set of pause switches,
    (j) each gate of the second set having first, second and third legs,
    (k) first and second control circuits connected to and operated respectively first by said first set of gates and then by said second set of gates, said first set of wind gates making said first control circuit conductive and said second control circuit non-conductive to initiate said wind period of operation in said machine, and said second set of pause gates making said second control circuit conductive and said first circuit non-conductive to initiate said pause period of operation in said machine,
    (l) and a second pulse counting means connected to and responsive to the operation of one of said control circuits, said second counting means determining the number of the program cycles included in said complete cycle repeated by said machine.

2. The programmer as defined in claim 1 in which said second pulse counting means includes a reset amplifier for resetting said second counting means, a program selecting switch connected in the circuit of said second pulse counting means and said reset amplifier and having manually settable means for selecting the number of program cycles to be included in said complete cycle by said second pulse counting means, 3. The programmer as defined in claim 1 which also includes a connection between one of said control circuits and said second means for alternately connecting said first and second sources to said first pulse counting means.

4. The programmer as defined in claim 1 which also includes a connection between a third leg of each gate in said first and second sets of gates and said second counting means, connections between first and second legs of each wind gate and a corresponding wind switch, and connections between first and second legs of each pause gate and a corresponding pause switch, whereby each gate is rendered operative only when three signals are impressed simultaneously on any given gate by said first and second counting means.

5. In a ball winding machine, a programmer for controlling the operation of said machine by controlling the duration of pause and wind periods of the program cycles, each composed of one wind period and one pause period, and of complete cycle composed of a plurality of program cycles, said programmer including
   (a) a first source of wind pulses for timing individual wind periods,
   (b) a second source of pause pulses for timing individual pause periods,
   (c) common first pulse counting means connected to said first and second sources,
   (d) means interposed between said first and second sources and said common first pulse counting means to make said first counting means responsive only to one source at a time,
   (e) a first set of manually settable wind switches,
   (f) a second set of manually settable pause switches,
   (g) both sets of said switches being connected in parallel to and simultaneously energized by said first counting means first in response to a selectable number of said wind pulses and then in response to a selectable number of said pause pulses,
   (h) a first set of gates connected to wind switches,
   (i) a second set of gates connected to pause switches,
   (j) a first control circuit connected to and controlled by said first set of gates to make said machine operate during said wind periods,
   (k) a second control circuit connected to and controlled by said second set of gates to make said machine operate during said pause periods,
   (l) second pulse counting means connected to and operated by one of said first and second sets of gates, said second pulse counting means counting the number of program cycles,
   (m) and a program selecting switch connected between said second counting means and that set of gates which is used for operating said second pulse counting means, the setting of said switch determining the number of program cycles included in said complete cycle.

6. The programmer as defined in claim 5 in which
   (a) said first and second sets of gates each includes a corresponding plurality of three leg gates,
   (b) the two legs of each gate being connected to and energized by said first counting means,
   (c) and the third leg of each gate being connected to and being energized by said second pulse counting means.

7. The programmer as defined in claim 5 in which
   (a) said first and second control circuits comprise a flip-flop circuit connected to and controlled by said first and second sets of gates,
   (b) first means connected to and operated by said flip-flop circuit and also connected to said first counting means for resetting said first counting means every time upon the operation of said flip-flop circuit, and second means connected between said flip-flop circuit and said second counting means for resetting said second counting means upon the number of operations of said flip-flop circuit determined by the setting of said program selecting switch.

References Cited by the Examiner
UNITED STATES PATENTS

| 2,913,627 | 11/1959 | Maag | 328—75 |
| 2,975,338 | 3/1961 | Bivins et al. | 328—48 |

OTHER REFERENCES

Pages 120–123, March 1947, Electronics, volume 20.

MALCOLM A. MORRISON, *Primary Examiner.*

JOSEPH P. STRIZAK, *Examiner.*